March 26, 1946. H. C. HEATON 2,397,139
ROTARY HELICAL FLUID UNIT
Filed June 5, 1941 16 Sheets-Sheet 4
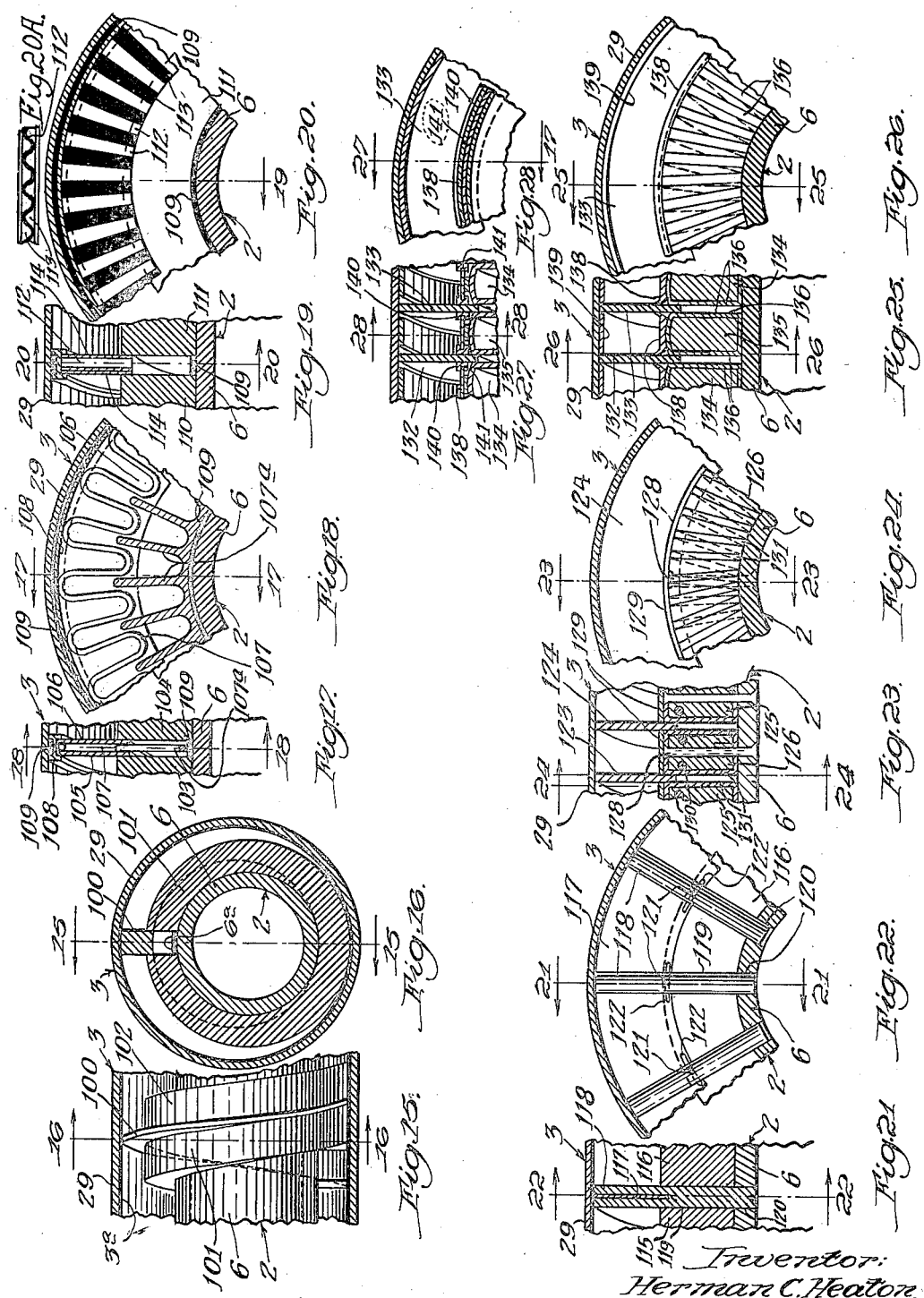
Inventor:
Herman C. Heaton.
By Chitton, Wiles, Davis & Hirschl.
Attys.

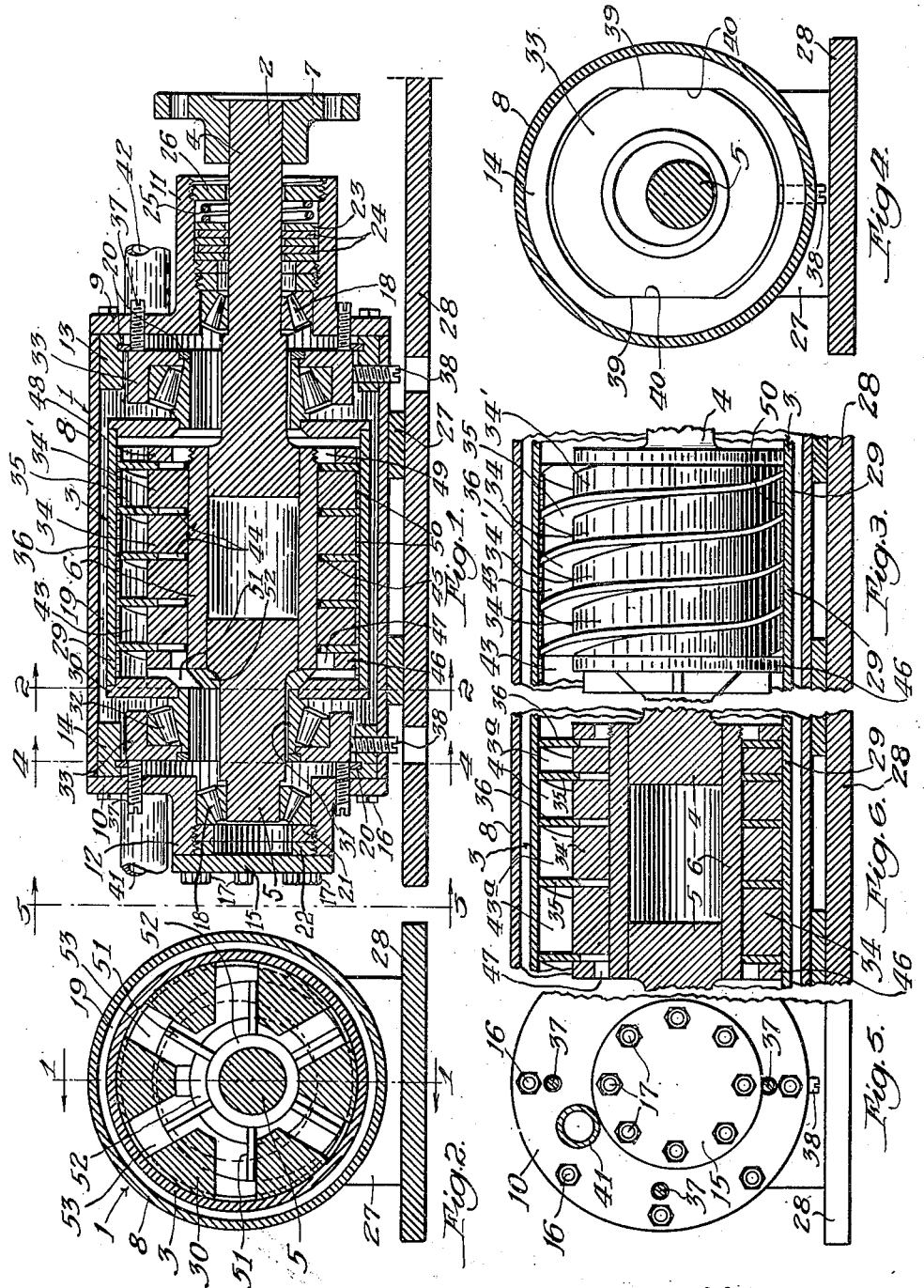

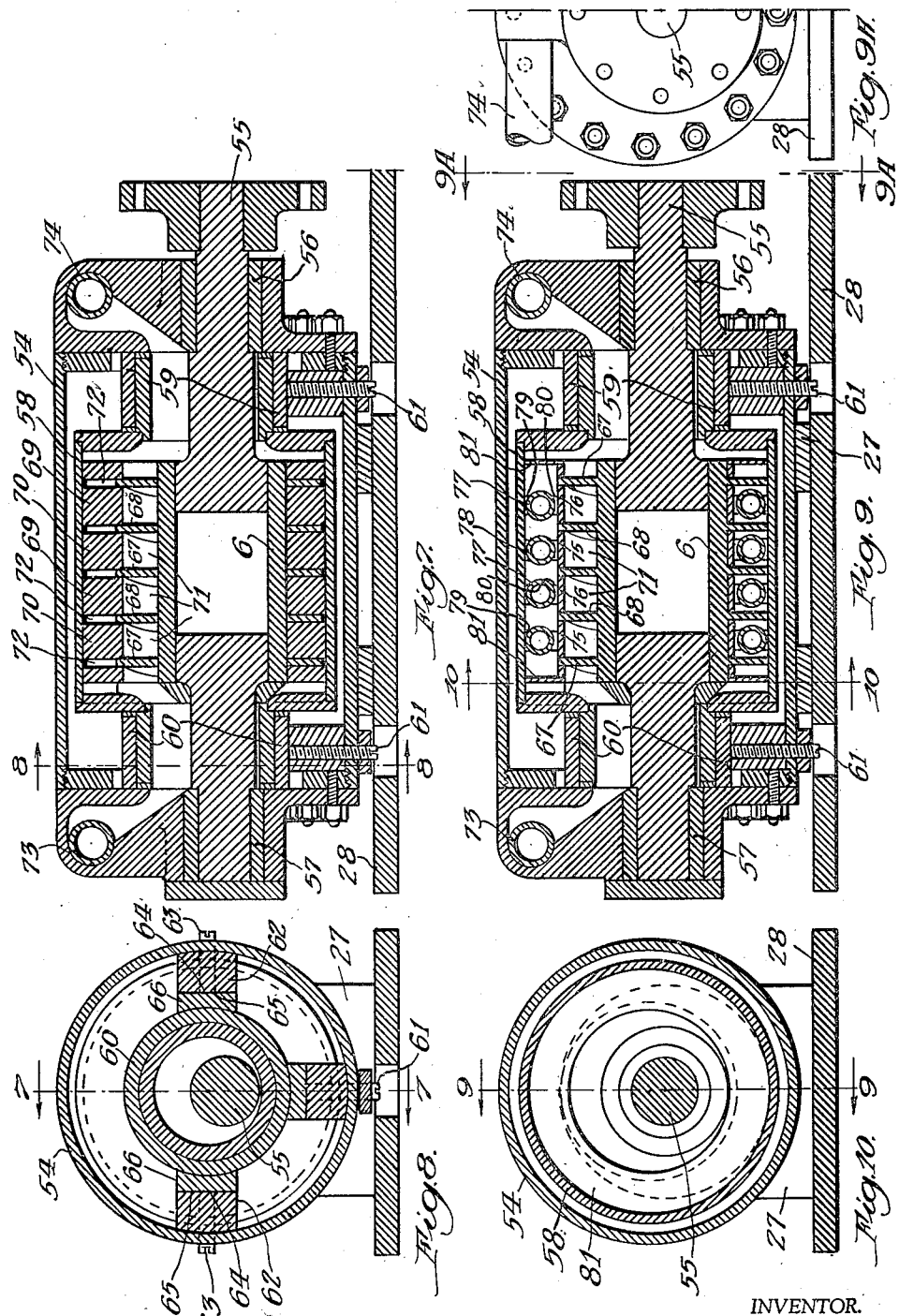

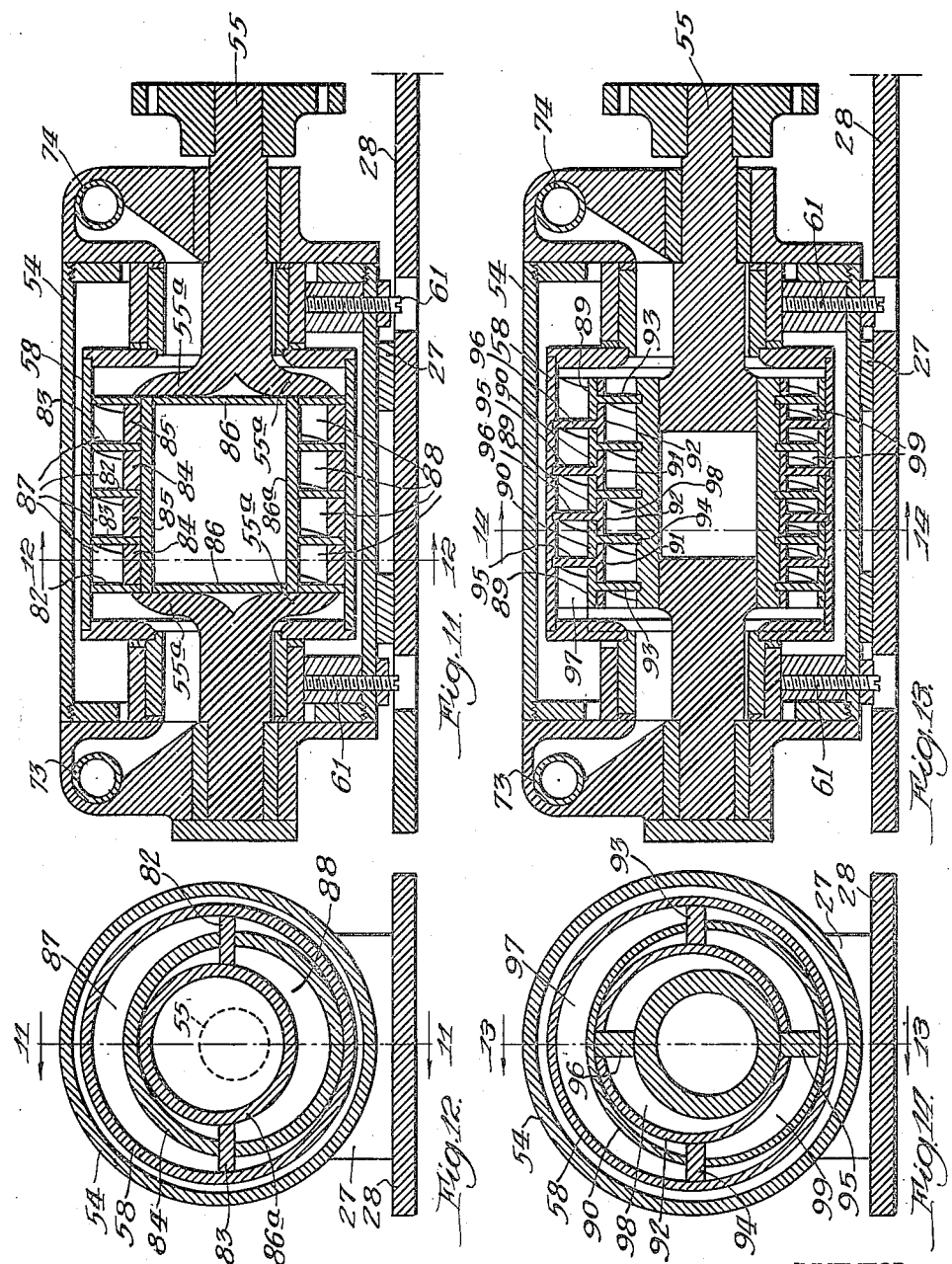

March 26, 1946.                    H. C. HEATON                    2,397,139
                              ROTARY HELICAL FLUID UNIT
                       Filed June 5, 1941          16 Sheets-Sheet 5
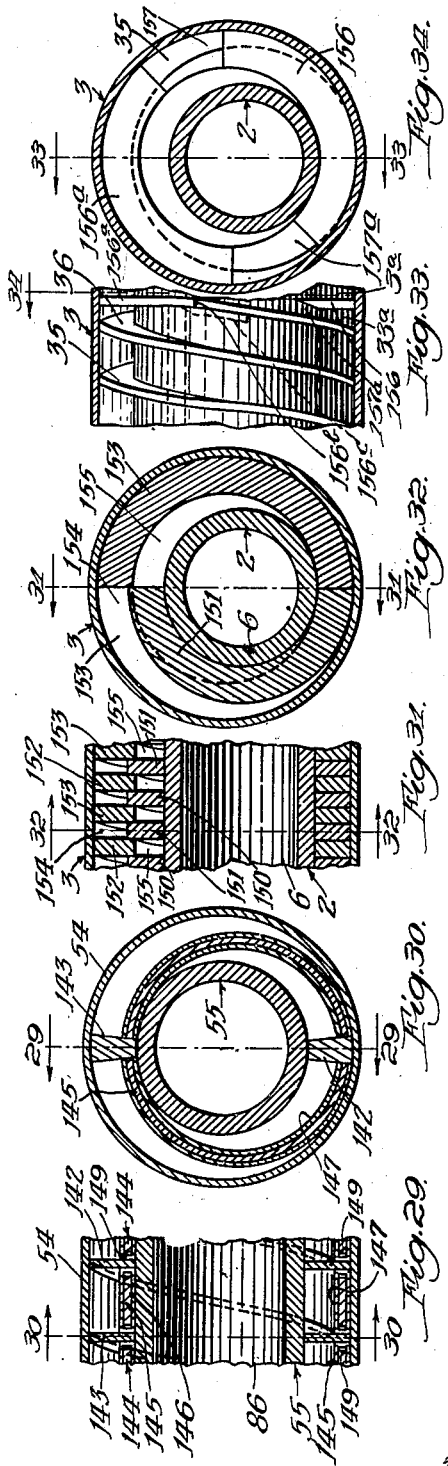
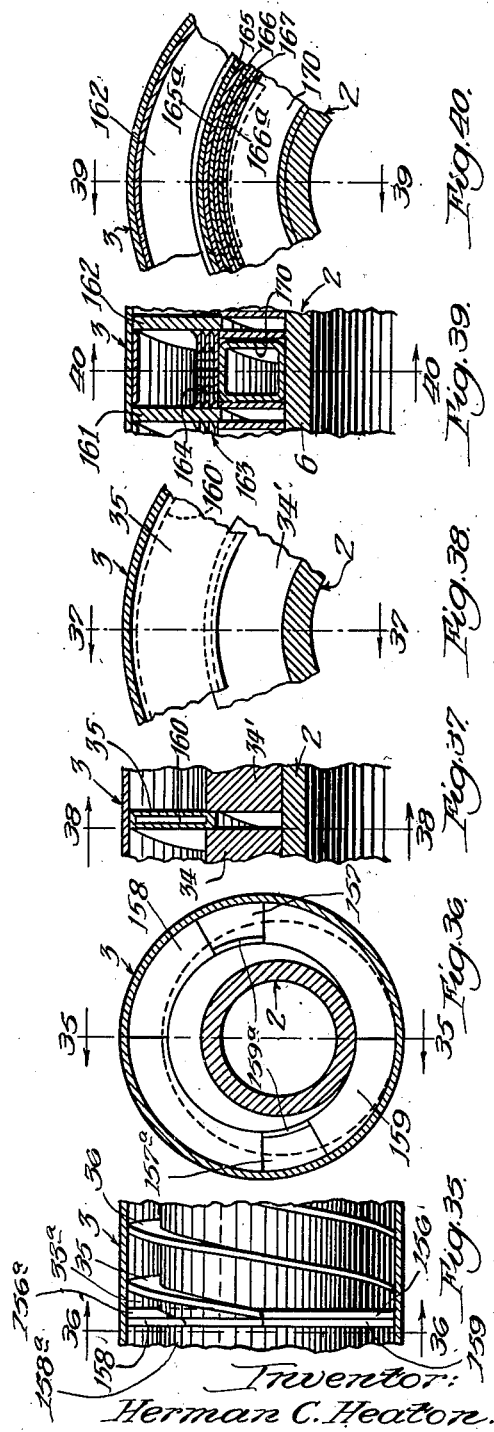
Inventor:
Herman C. Heaton.
By Chritton, Wiles, Davies & Hirschl.
Attys.

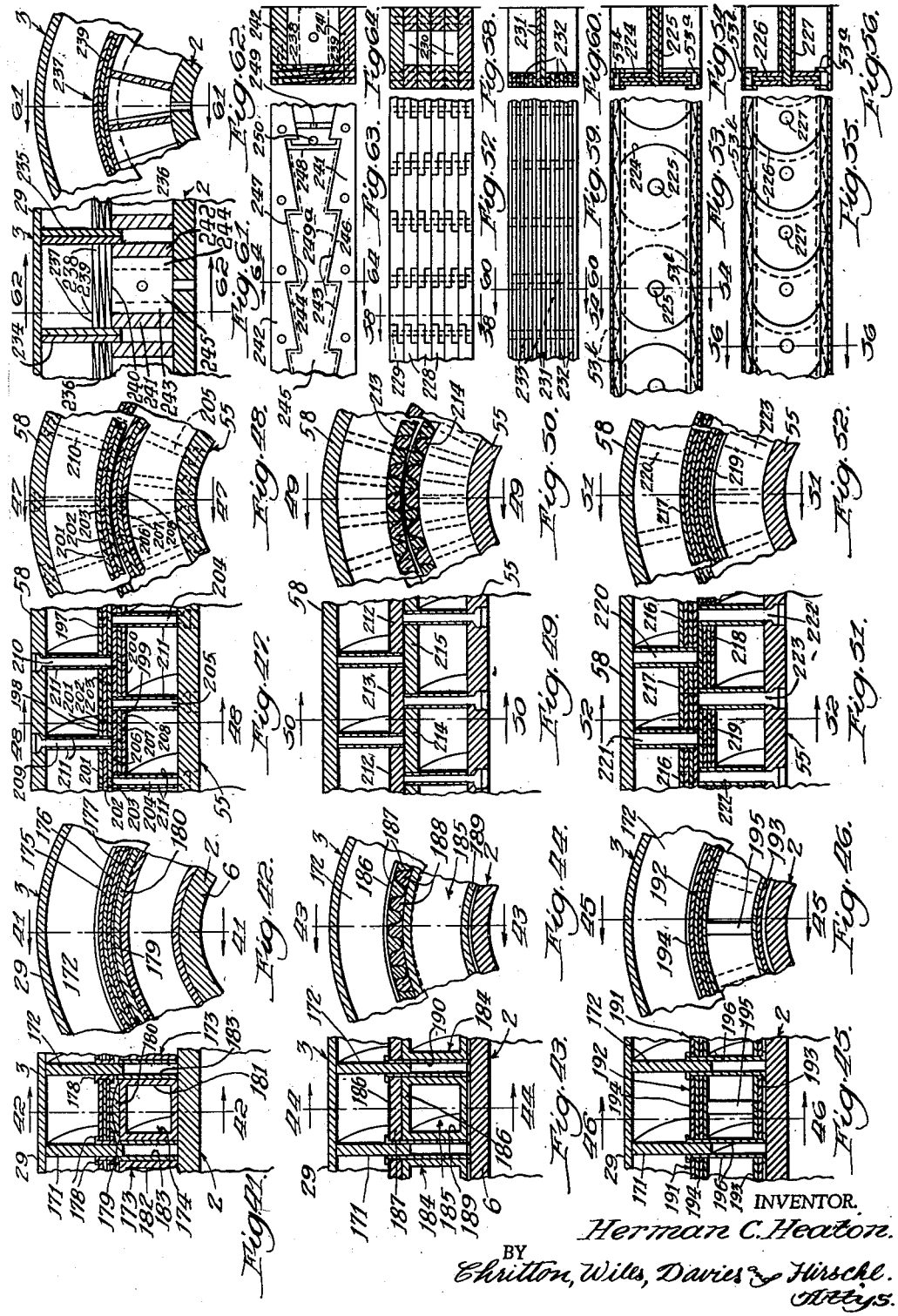

March 26, 1946. H. C. HEATON 2,397,139
ROTARY HELICAL FLUID UNIT
Filed June 5, 1941 16 Sheets-Sheet 7
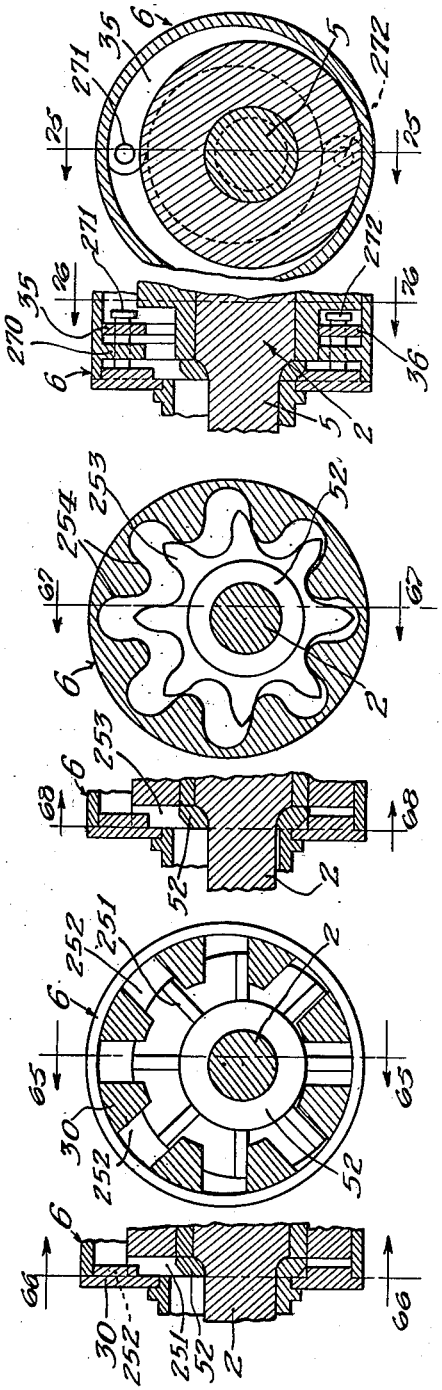
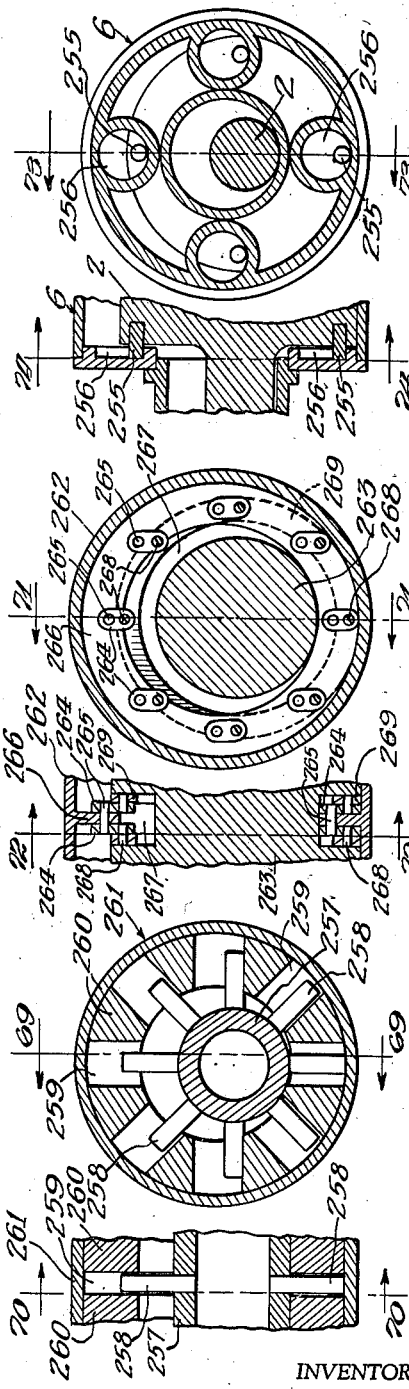
INVENTOR.
Herman C. Heaton
BY Chritton, Wiles, Davies & Hirschl
Attys.

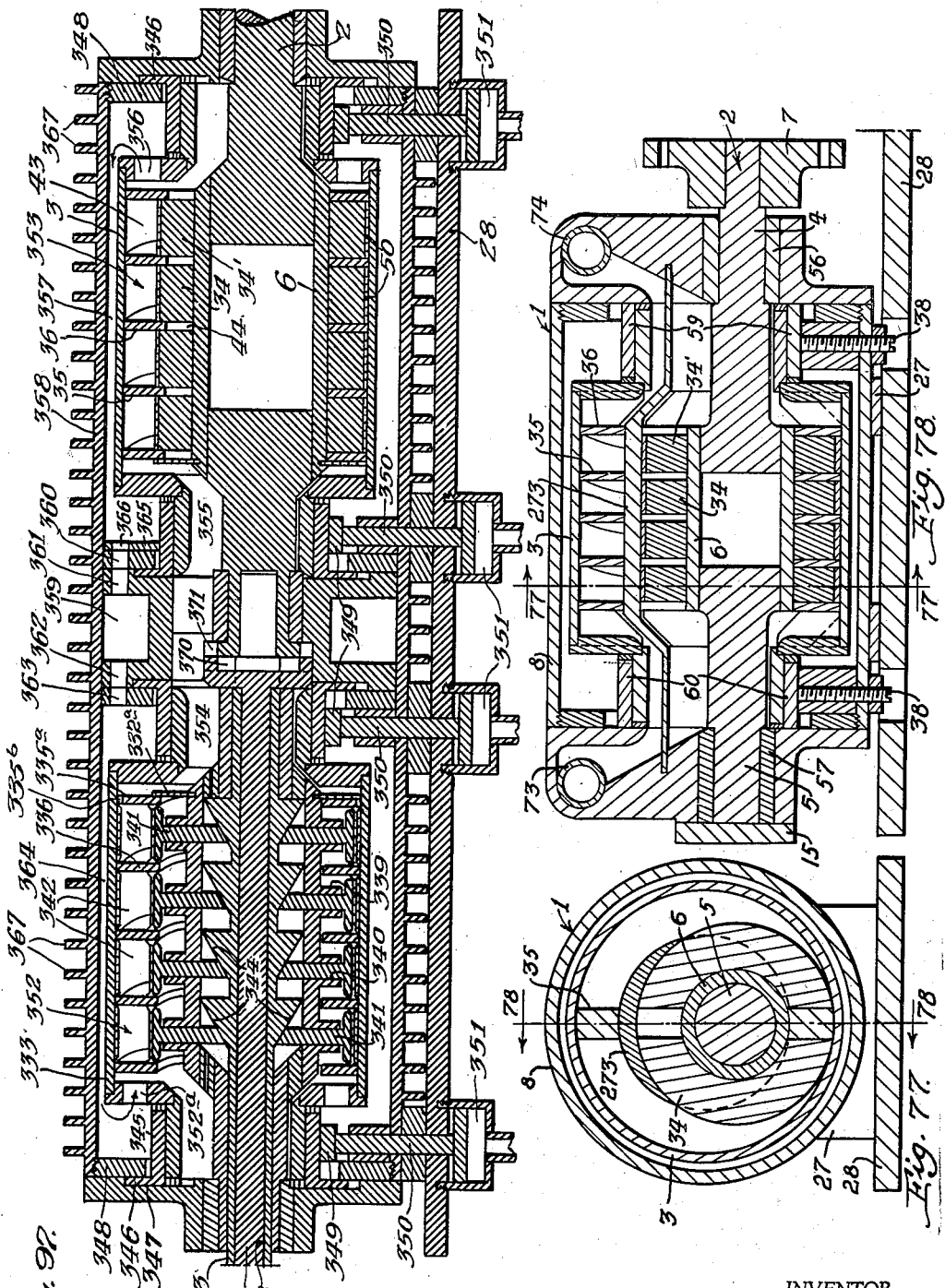

March 26, 1946.  H. C. HEATON  2,397,139
ROTARY HELICAL FLUID UNIT
Filed June 5, 1941  16 Sheets-Sheet 9
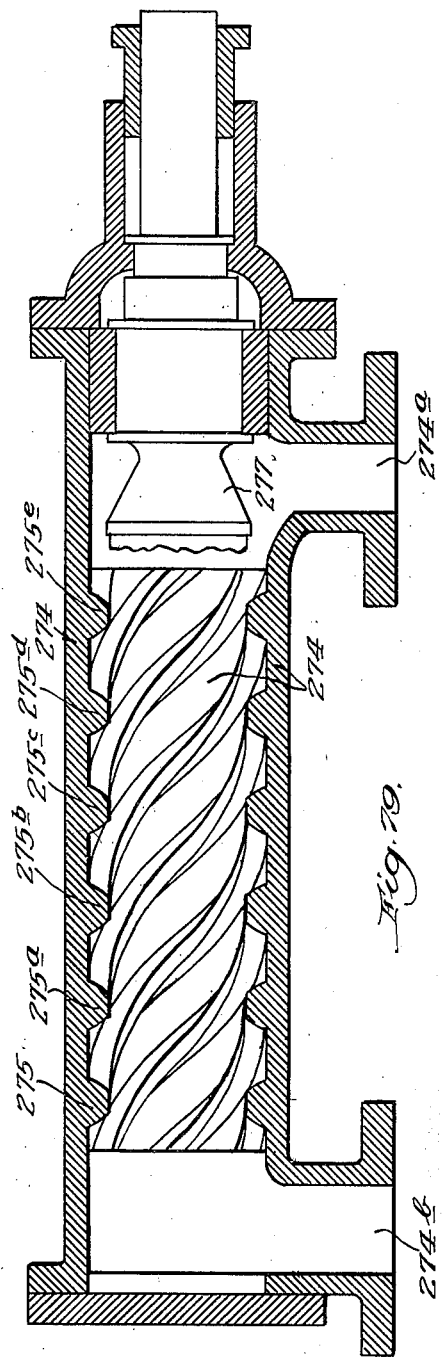
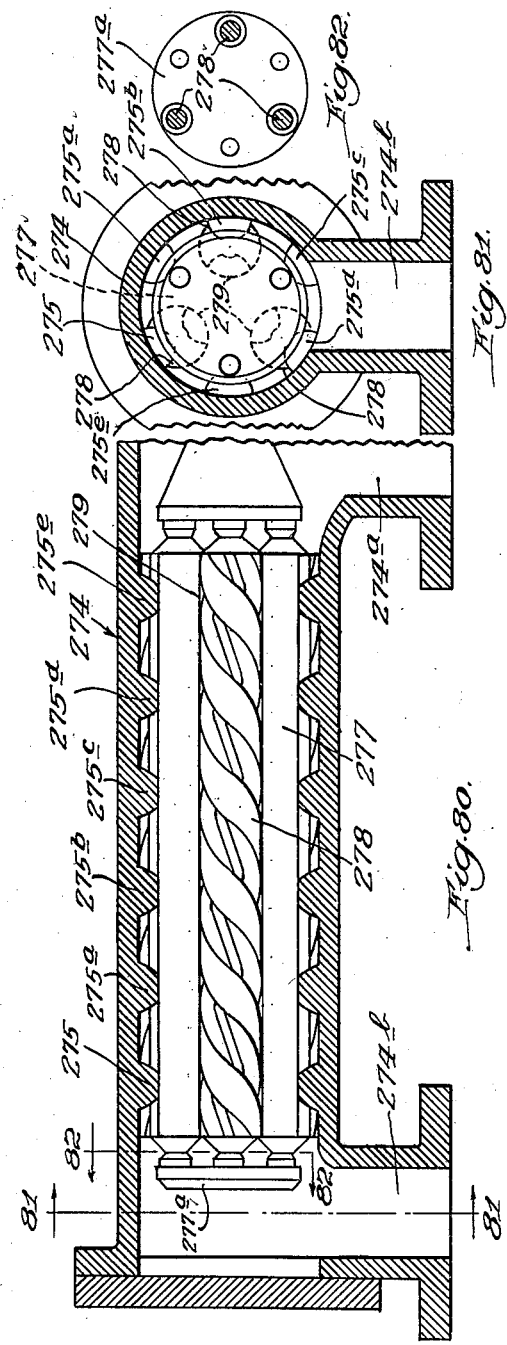
Inventor:
Herman C. Heaton.
By Chritton, Wiles, Davis & Hirschl.
Attys.

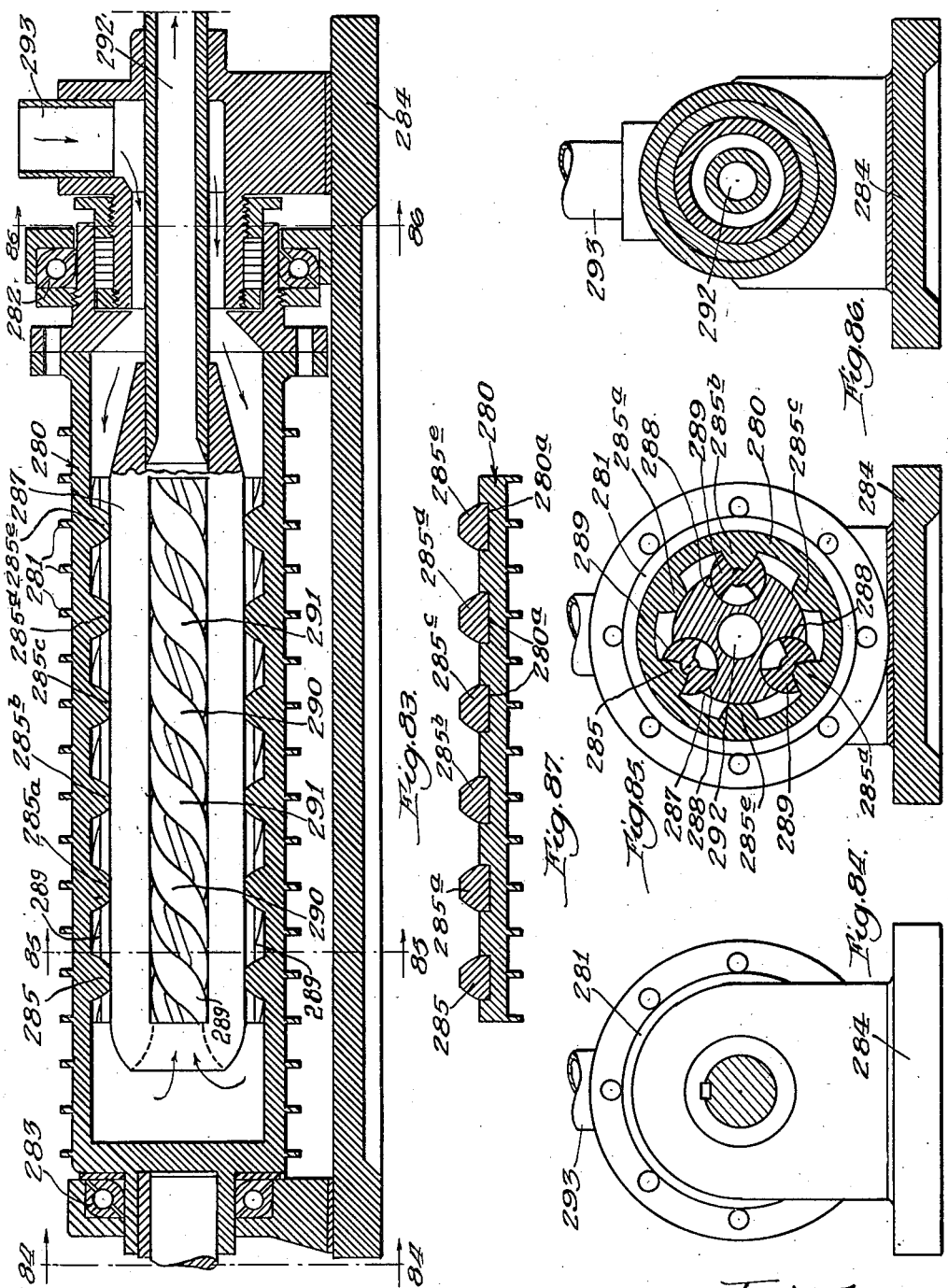

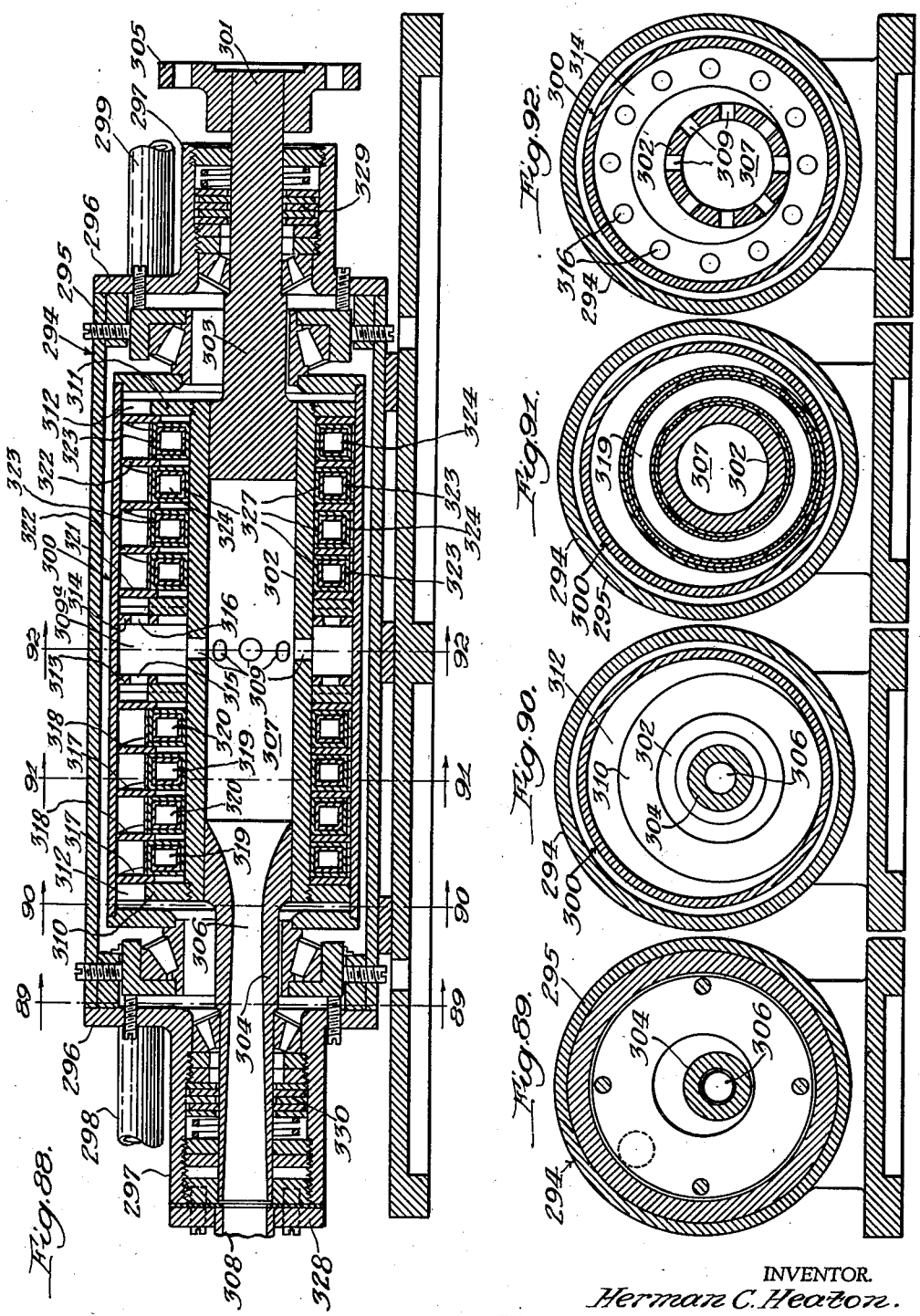

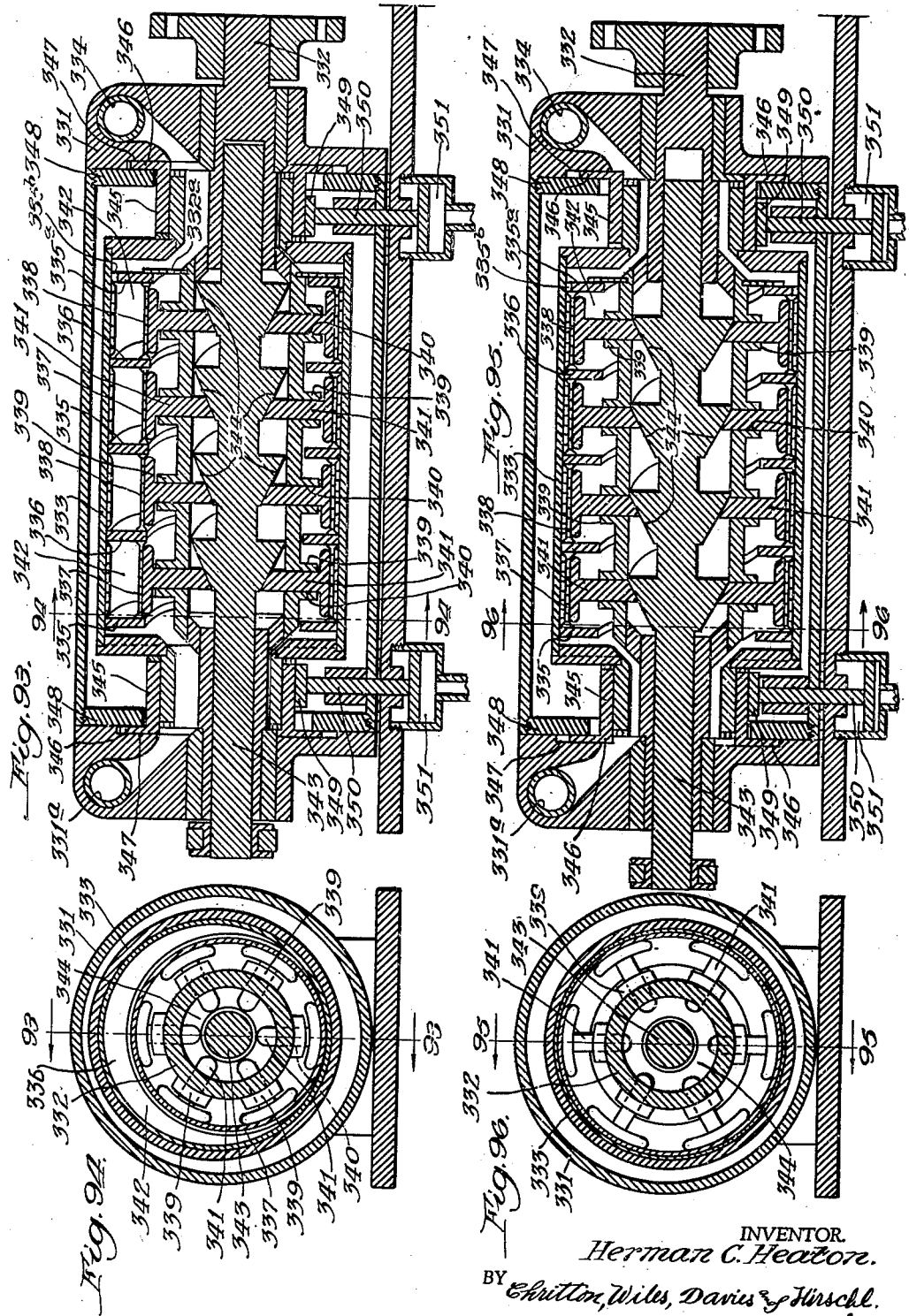

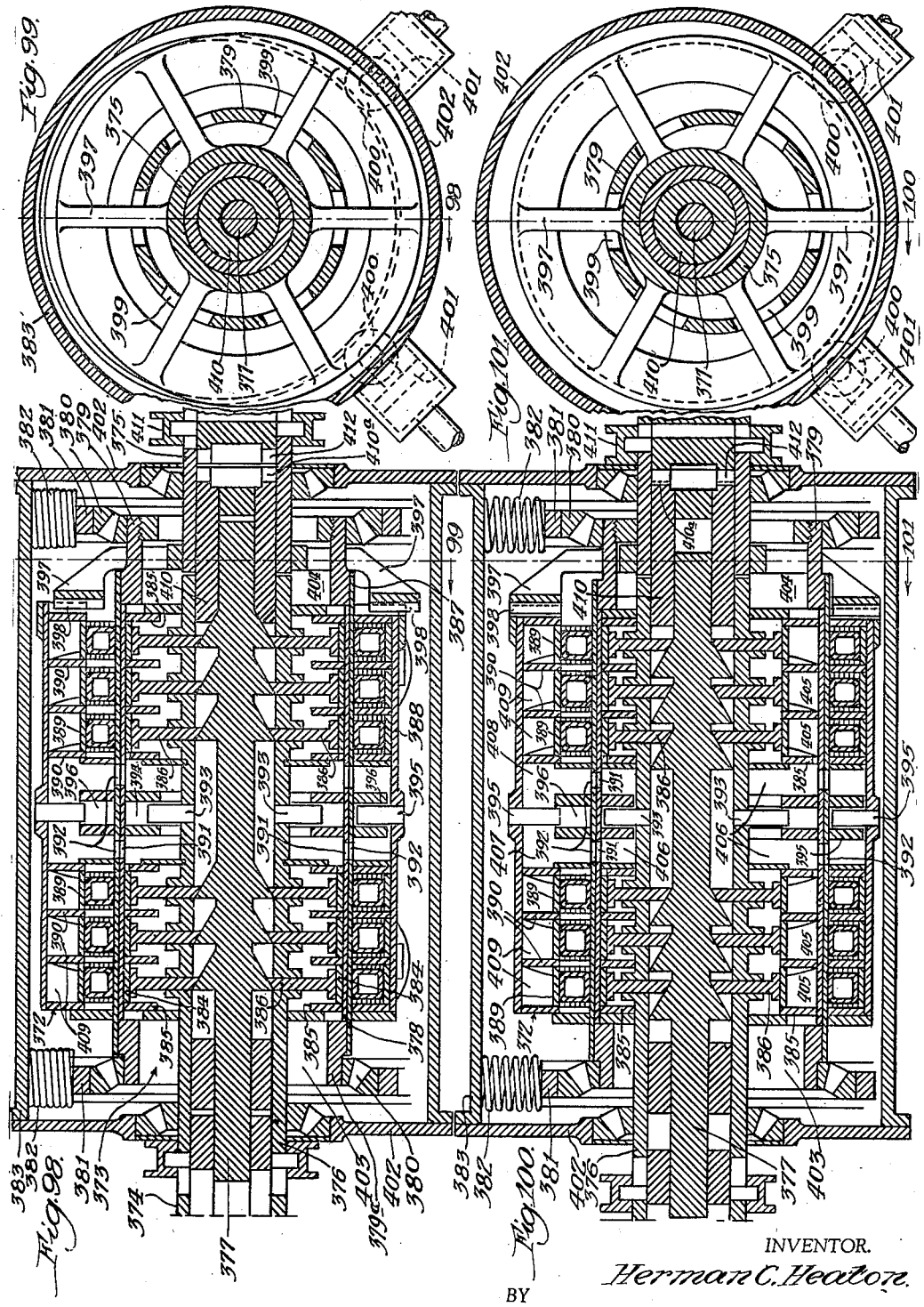

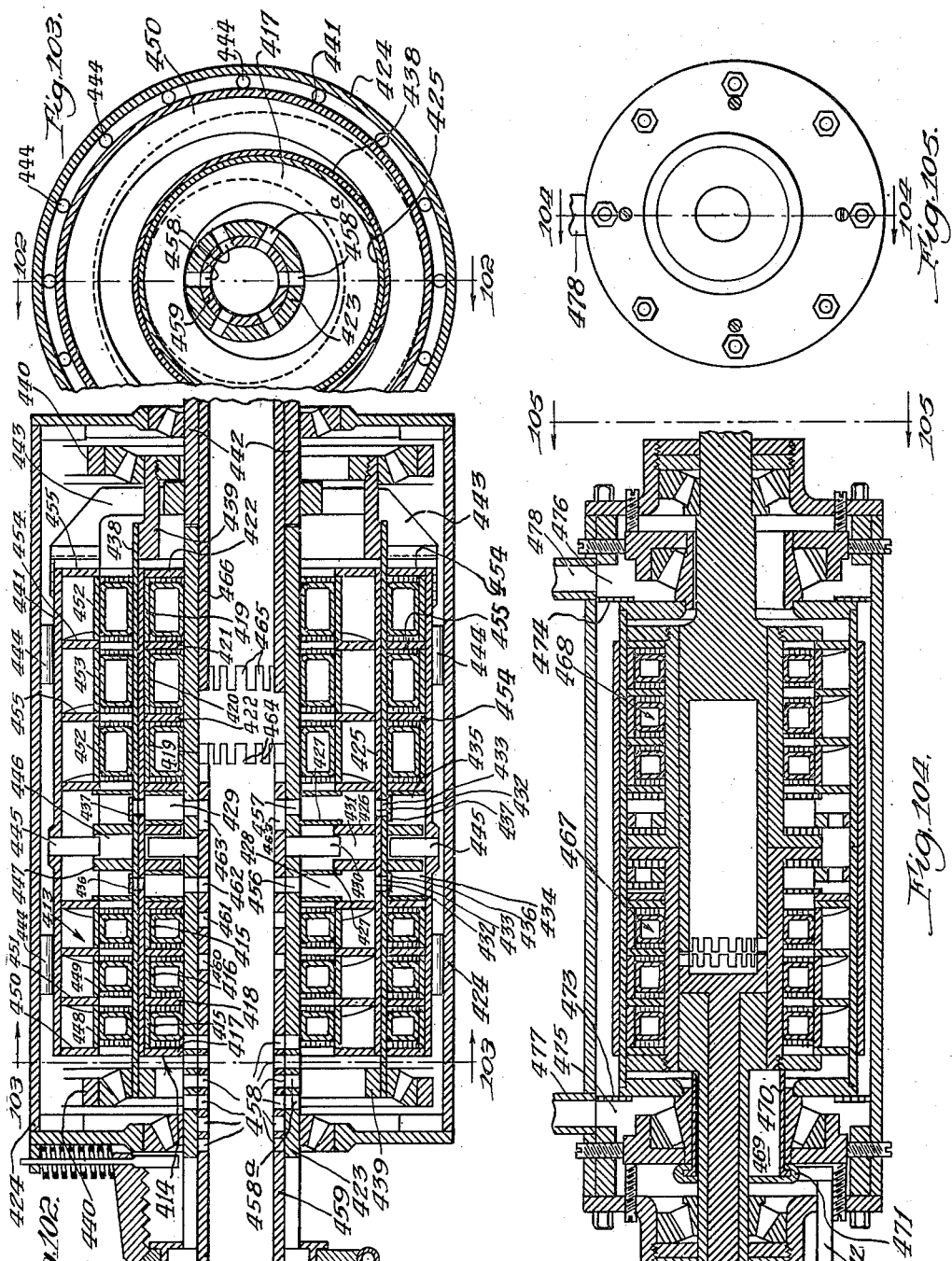

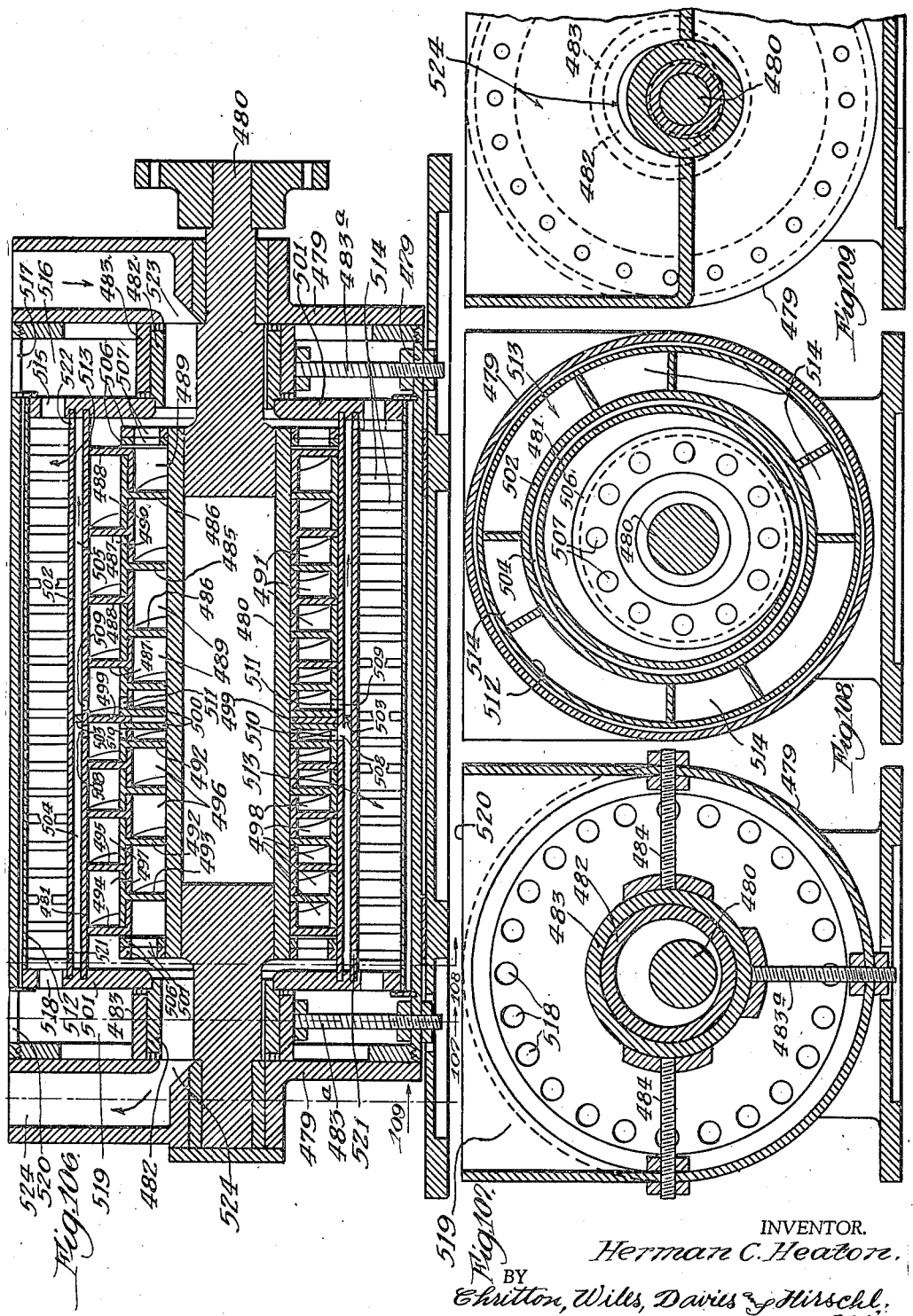

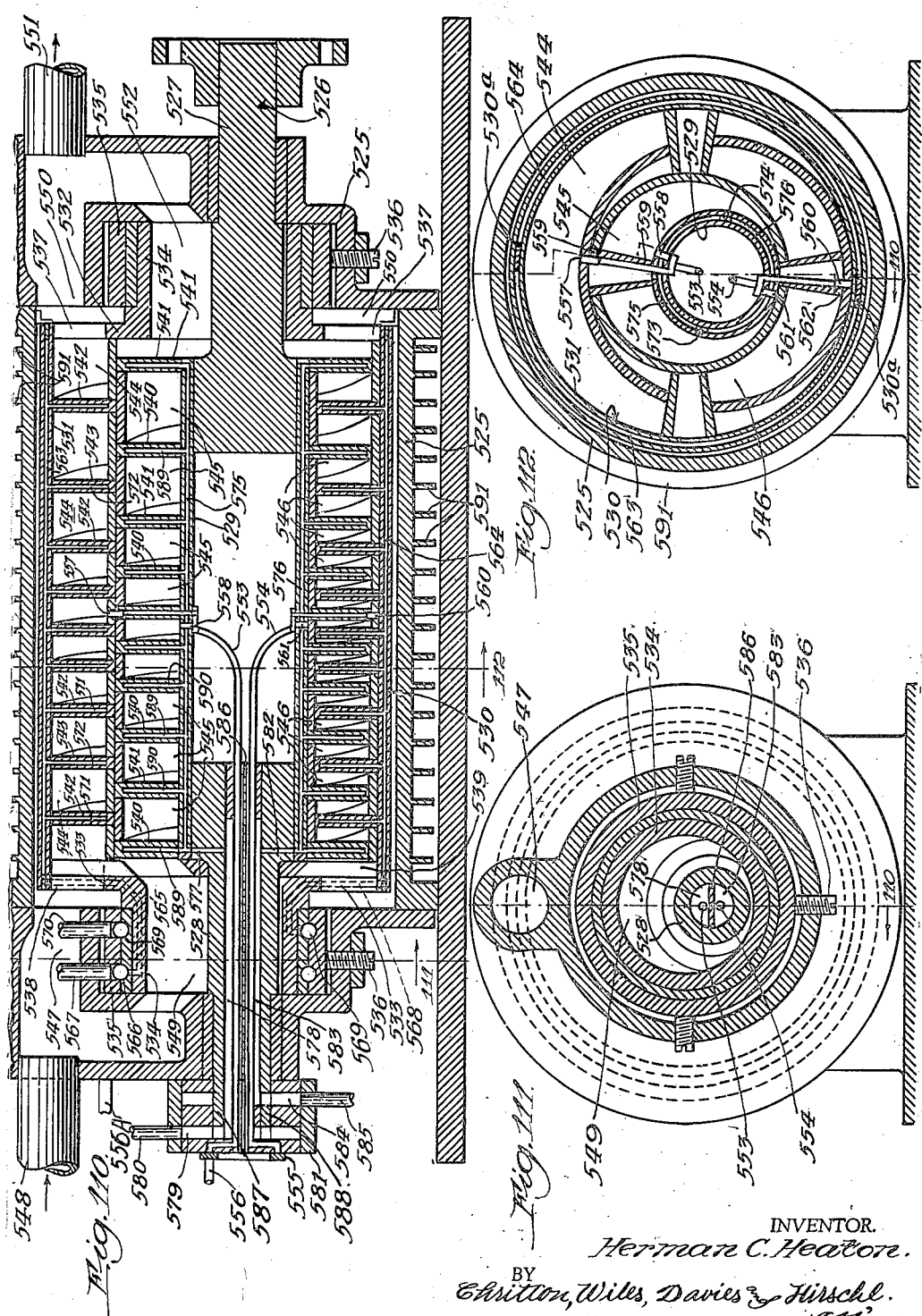

Patented Mar. 26, 1946

2,397,139

UNITED STATES PATENT OFFICE 2,397,139

ROTARY HELICAL FLUID UNIT

Herman C. Heaton, Chicago, Ill.

Application June 5, 1941, Serial No. 396,771

8 Claims. (Cl. 103—121)

My invention relates to units of the type above referred to which either operate on, or are operated by, fluid, such as for example pumps for handling liquids (without volumetric compression), compressors for handling gaseous fluid (with volumetric compression), fluid motors to be driven by liquid (without volumetric expansion), fluid motors to be driven by gaseous fluid under pressure (with volumetric expansion), steam engines, internal combustion engines, heat pumps, or, in fact, any mechanism for performing work on a fluid or, conversely, for converting the pressure energy of a fluid into rotary motion, in mechanisms involving a combination of fluid units, such as power generating units consisting of one or more compressors and fluid motors, hydraulic power transmission units consisting of one or more hydraulic pumps and hydraulic motors with fluid-controlling means, as well as other combinations of such units.

More particularly my invention as to a certain phase thereof relates to units of the type above referred to involving co-operating helices and wherein the flow of fluid in the mechanism is in an axial direction.

One of my objects is to provide a unit of the type above referred to whereby the conversion of energy is obtained with the minimum loss of energy, viz., at the maximum attainable efficiency.

In the case of units of this type as hitherto provided, objectionable leakage or slippage of the fluid past the working surfaces occurs, greatly reducing the efficiency of the unit.

In this connection an object of my invention is to greatly minimize objectionable leakage or slippage of the fluid militating against efficiency in the operation of the unit; to reduce wear of the parts; and to render the operation of the unit vibrationless and noiseless at all speeds. Other objects are to provide new and improved constructions of devices for specific purposes as will be understood from the following description.

Referring to the accompanying drawings:

Figure 1 is a view in longitudinal sectional elevation of a fluid unit embodying my invention shown as in a form suitable for use either as a pump to pump liquid, such as for example oil, or as a motor to be operated by a liquid under pressure.

Figure 2 is a section taken at the line 2—2 on Fig. 1 and viewed in the direction of the arrow.

Figure 3 is a view like Fig. 1, of the central helices-equipped portion of the unit showing parts of the structure in elevation.

Figure 4 is a section taken at the line 4—4 on Fig. 1 and viewed in the direction of the arrows.

Figure 5 is an end view of the unit of Fig. 1 with a portion thereof broken away, the structure being viewed along the line 5—5 on Fig. 1 and in the direction of the arrows.

Figure 6 is a view like Fig. 3 of the central helices-equipped portion of the unit modified to adapt the mechanism for compressing gaseous fluid when used as a pump, or operated by gaseous fluid under pressure when used as a motor.

Figure 7 is a view in vertical sectional elevation of another form of fluid unit embodying my invention.

Figure 8 is a section taken at the line 8—8 on Fig. 7 and viewed in the direction of the arrow.

Figure 9 is a view like Fig. 7 of another form of fluid unit embodying my invention.

Figure 9a is a fragmentary end view of the unit taken at the line 9a—9a on Fig. 9 and viewed in the direction of the arrows.

Figure 10 is a section taken at the line 10—10 on Fig. 9 and viewed in the direction of the arrow.

Figure 11 is a view like Fig. 7 of another form of fluid unit embodying my invention.

Figure 12 is a section taken at the line 12—12 on Fig. 11 and viewed in the direction of the arrow.

Figure 13 is a view like Fig. 7 of another form of fluid unit embodying my invention.

Figure 14 is a section taken at the line 14—14 on Fig. 13 and viewed in the direction of the arrow.

Figures 15–64, inclusive, show certain of the additional forms in which the helical structures may be provided.

Figure 15 is a fragmentatry view, partly in longitudinal section and partly in longitudinal elevation, of one of such additional forms, the section being taken at the line 15—15 on Fig. 16 and viewed in the direction of the arrows.

Figure 16 is a transverse sectional view of the structure of Fig. 15, the section being taken at the line 16—16 on Fig. 15 and viewed in the direction of the arrows.

Figure 17 is a fragmentary view in longitudinal section of another of such additional forms, the section being taken at the line 17—17 on Fig. 18 and viewed in the direction of the arrows.

Figure 18 is a fragmentary transverse sectional view of the structure of Fig. 17, the helices being shown in elevation, the section being taken at the line 18—18 on Fig. 17 and viewed in the direction of the arrows.

Figure 19 is a view like Fig. 17 of another of such additional forms, the section being taken at the line 19 on Fig. 20 and viewed in the direction of the arrows.

Figure 20 is a fragmentary transverse sectional view of the structure of Fig. 19, the helices being shown in elevation, the section being taken at the line 20—20 on Fig. 19 and viewed in the direction of the arrows.

Figure 20a is a fragmentary peripheral edge view of the helices shown in Fig. 20.

Figure 21 is a view like Fig. 17 of another of such additional forms, the section being taken at the line 21—21 on Fig. 22 and viewed in the direction of the arrows.

Figure 22 is a fragmentary transverse sectional view of the structure of Fig. 21, the helices being shown in elevation, the section being taken at the line 22—22 on Fig. 21 and viewed in the direction of the arrows.

Figure 23 is a view like Fig. 17 of another of such additional forms, the section being taken at the line 23—23 on Fig. 24 and viewed in the direction of the arrows.

Figure 24 is a fragmentary transverse sectional view of the structure of Fig. 23, the helices being shown in elevation, the section being taken at the line 24—24 on Fig. 23 and viewed in the direction of the arrows.

Figure 25 is a view like Fig. 17 of another of such additional forms, the section being taken at the line 25—25 on Fig. 26 and viewed in the direction of the arrows.

Figure 26 is a fragmentary transverse sectional view of the structure of Fig. 25, the helices being shown in elevation, the section being taken at the line 26—26 on Fig. 25 and viewed in the direction of the arrows.

Figure 27 is a view like Fig. 17 of another of such additional forms, the section being taken at the line 27—27 on Fig. 28 and viewed in the direction of the arrows.

Figure 28 is a fragmentary transverse sectional view of the structure of Fig. 27, the helices being shown in elevation, the section being taken at the line 28—28 on Fig. 27 and viewed in the direction of the arrows.

Figure 29 is a view like Fig. 17 of another one of such additional forms, the section being taken at the line 29—29 on Fig. 30 and viewed in the direction of the arrows.

Figure 30 is a sectional view taken at the line 30—30 on Fig. 29 and viewed in the direction of the arrows.

Figure 31 is a view like Fig. 17 of another of such additional forms, the section being taken at the line 31—31 on Fig. 32 and viewed in the direction of the arrows.

Figure 32 is sectional view taken at the line 32—32 on Fig. 31 and viewed in the direction of the arrows.

Figure 33 is a view like Fig. 15 of another of such additional forms, the section being taken at the line 33—33 on Fig. 34 and viewed in the direction of the arrows.

Figure 34 is a section taken at the line 34—34 on Fig. 33 and viewed in the direction of the arrows.

Figure 35 is a view like Fig. 15, of another of such additional forms, the section being taken at the line 35—35 on Fig. 36 and viewed in the direction of the arrows.

Figure 36 is a section taken at the line 36—36 on Fig. 35 and viewed in the direction of the arrows.

Figure 37 is a view like Fig. 17 of another one of additional forms, the section being taken at the line 37—37 on Fig. 38 and viewed in the direction of the arrows.

Figure 38 is a fragmentary transverse sectional view of the structure of Fig. 37, the helices being shown in elevation, the section being taken at the line 38—38 on Fig. 37 and viewed in the direction of the arrows.

Figure 39 is a view like Fig. 17 of another of such additional forms, the section being taken at the line 39—39 on Fig. 40 and viewed in the direction of the arrows.

Figure 40 is a fragmentary transverse sectional view of the structure of Fig. 39, the helices being shown in elevation, the section being taken at the line 40—40 on Fig. 39 and viewed in the direction of the arrow.

Figure 41 is a view like Fig. 17 of another of such additional forms, the section being taken at the line 41—41 on Fig. 42 and viewed in the direction of the arrows.

Figure 42 is a fragmentary section taken at the line 42—42 on Fig. 41 and viewed in the direction of the arrow.

Figure 43 is a view like Fig. 17 of another of such additional forms, the section being taken at the line 43—43 on Fig. 44 and viewed in the direction of the arrows.

Figure 44 is a fragmentary section taken at the line 44—44 on Fig. 43 and viewed in the direction of the arrows.

Figure 45 is a view like Fig. 17 of another of such additional forms, the section being taken at the line 45—45 on Fig. 46 and viewed in the direction of the arrows.

Figure 46 is a fragmentary section taken at the line 46—46 on Fig. 45 and viewed in the direction of the arrows.

Figure 47 is a view like Fig. 17 of another of such additional forms, the section being taken at the line 47—47 on Fig. 48 and viewed in the direction of the arrows.

Figure 48 is a fragmentary section taken at the line 48—48 on Fig. 47 and viewed in the direction of the arrows.

Figure 49 is a view like Fig. 17 of another of such additional forms, the section being taken at the line 49—49 on Fig. 50 and viewed in the direction of the arrows.

Figure 50 is a fragmentary section taken at the line 50—50 on Fig. 49 and viewed in the direction of the arrows.

Figure 51 is a view like Fig. 17 of another of such additional forms, the section being taken at the line 51—51 on Fig. 52 and viewed in the direction of the arrows.

Figure 52 is a fragmentary section taken at the line 52—52 on Fig. 51 and viewed in the direction of the arrows.

Figure 53 is a fragmentary developed plan view of another of such additional forms.

Figure 54 is an end view of the structure of Fig. 53.

Figure 55 is a fragmentary developed plan view of another of such additional forms.

Figure 56 is an end view of the structure of Fig. 55.

Figure 57 is a fragmentary developed plan view of another of such additional forms.

Figure 58 in an end view of the structure of Fig. 57.

Figure 59 is a fragmentary developed plan view of another of such additional forms.

Figure 60 is an end view of the structure of Fig. 59.

Figure 61 is a view like Fig. 17 of another of such additional forms the section being taken at the line 61—61 on Fig. 62 and viewed in the direction of the arrows.

Figure 62 is a section taken at the line 62—62 on Fig. 61 and viewed in the direction of the arrows.

Figure 63 is a fragmentary developed plan view of one of the helices of the structure of Figs. 61 and 62 with certain superposed parts omitted.

Figure 64 is a transverse sectional view of the structure shown in Fig. 63 with the parts omitted in Fig. 63, included, said parts being shown in section.

Figures 65–74 illustrate certain of the additional forms of means for synchronizing the rotation of the shell and core of the fluid units.

Figure 65 is a fragmentary view in longitudinal section of one of such additional forms, the section being taken at the line 65—65 on Fig. 66.

Figure 66 is a fragmentary section taken at the line 66—66 on Fig. 65 and viewed in the direction of the arrows.

Figure 67 is a view like Fig. 65 of another of such additional forms, the section being taken at the line 67—67 on Fig. 68 and viewed in the direction of the arrows.

Figure 68 is a fragmentary section taken at the line 68—68 on Fig. 67 and viewed in the direction of the arrows.

Figure 69 is a view like Fig. 65 of another of such additional forms, the section being taken at the line 69—69 on Fig. 70 and viewed in the direction of the arrows.

Figure 70 is a fragmentary section taken at the line 70—70 on Fig. 69 and viewed in the direction of the arrows.

Figure 71 is a view like Fig. 65 of another of such additional forms, the section being taken at the line 71—71 and viewed in the direction of the arrow.

Figure 72 is a fragmentary section taken at the line 72—72 on Fig. 71 and viewed in the direction of the arrows.

Figure 73 is a view like Fig. 65 of another of such additional forms, the section being taken at the line 73—73 on Fig. 74 and viewed in the direction of the arrows.

Figure 74 is a fragmentary section taken at the line 74—74 on Fig. 73 and viewed in the direction of the arrows.

Figure 75 is a view like Fig. 65 illustrating a means for connecting the outer helices of the shell, the section being taken at the line 75—75 on Fig. 76 and viewed in the direction of the arrows.

Figure 76 is a fragmentary section taken at the line 76—76 on Fig. 75 and viewed in the direction of the arrows.

Figure 77 is a transverse sectional view of another form of fluid unit embodying my invention, the section being taken at the line 77—77 on Fig. 78 and viewed in the direction of the arrows.

Figure 78 is a section taken at the line 78—78 on Fig. 77 and viewed in the direction of the arrows.

Figure 79 is a view in longitudinal sectional elevation of another form of fluid unit embodying my invention, the central core being broken away.

Figure 80 is a similar view showing the core in elevation.

Figure 81 is a section taken at the line 81—81 on Fig. 80 and viewed in the direction of the arrow.

Figure 82 is a sectional view of one end of the core, the section being taken at the line 82—82 on Fig. 80 and viewed in the direction of the arrows.

Figure 83 is a view in longitudinal sectional elevation of another form of fluid unit embodying my invention, the central core being shown partly in elevation.

Figure 84 is an end view of the unit of Fig. 83 viewing the unit at the lines 84—84 and in the direction of the arrows.

Figure 85 is a section taken at the line 85—85 on Fig. 83 and viewed in the direction of the arrow.

Figure 86 is a section taken at the line 86—86 on Fig. 83 and viewed in the direction of the arrows.

Figure 87 is a fragmentary sectional view showing a modification of a detail of Fig. 83.

Figure 88 is a view in longitudinal sectional elevation of another form of fluid unit embodying my invention.

Figures 89–92 are transverse sectional views taken at the lines 89—89, 90—90, 91—91, and 92—92 on Fig. 88 and viewed in the direction of the arrows.

Figure 93 is a view in longitudinal sectional elevation of another form of fluid unit embodying my invention and providing for variable volumetric characteristics the parts being shown as positioned for maximum capacity, the section being taken at the line 93—93 on Fig. 94 and viewed in the direction of the arrows.

Figure 94 is a section taken at the line 94—94 on Fig. 93 and viewed in the direction of the arrows.

Figure 95 is a view like Fig. 93 of the construction shown therein, the parts being shown as positioned for zero capacity, the section being taken at the line 95—95 on Fig. 96 and viewed in the direction of the arrows.

Figure 96 is a section taken at the line 96—96 on Fig. 95 and viewed in the direction of the arrows.

Figure 97 is a view in longitudinal sectional elevation of an hydraulic transmission mechanism embodying my invention.

Figure 98 is a view in longitudinal sectional elevation of another form of hydraulic transmission embodying my invention, showing the parts in one position, the section being taken at the line 98 on Fig. 99 and viewed in the direction of the arrow.

Figure 99 is a transverse sectional view taken at the line 99—99 on Fig. 98 and viewed in the direction of the arrows.

Figure 100 is a view like Fig. 98 and the structure therein shown showing the parts in another position, the section being taken at the line 100 on Fig. 101 and viewed in the direction of the arrow.

Figure 101 is a transverse sectional view taken at the line 101—101 on Fig. 100 and viewed in the direction of the arrows.

Figure 102 is a view in longitudinal sectional elevation of another form of hydraulic transmission embodying my invention, the section being taken at the line 102—102 on Fig. 103 and viewed in the direction of the arrows.

Figure 103 is a sectional view taken at the line 103—103 on Fig. 102 and viewed in the direction of the arrows.

Figure 104 is a view in longitudinal sectional elevation of another form of hydraulic transmission embodying my invention, the section being taken at the line 104—104 on Fig. 105 and viewed in the direction of the arrows.

Figure 105 is a transverse elevation taken at the line 105—105 on Fig. 104 and viewed in the direction of the arrows.

Figure 106 is a view in longitudinal sectional elevation of a heat pump embodying my invention.

Figures 107–109, inclusive, are transverse sectional views, the sections being taken at the lines 107, 108, and 109 on Fig. 106 and viewed in the direction of the arrows.

Figure 110 is a view in longitudinal sectional elevation of an internal combustion engine embodying my invention; and Figures 111 and 112 are transverse sectional views, the sections being taken at the lines 111 and 112 on Fig. 110 and viewed in the direction of the arrows.

Referring to the construction shown in Figs. 1–5, inclusive, which represents a typical pump or motor for handling oil or other liquid, the mechanism comprises a stationary housing structure 1, a core or shaft portion 2 journaled in the housing structure 1 and a shell 3 interposed between the housing 1 and the core 2; the shell in accordance with one phase of my invention being rotatably supported.

The core 2 is shown as composed of axially alined shafts 4 and 5 connected together by a sleeve 6, the shaft 4 having a flange 7 at which to connect it with a power device to rotate the core 2 when the mechanism is used as a pump or to connect it with a device to be driven when the mechanism is used as a motor.

The housing structure 1 is shown as formed of a cylindrical central portion 8, end ring-shaped plates 9 and 10 having sleeve-extensions 11 and 12, respectively, internal rings 13 and 14 at the ends of the central portion 8 and a closure plate 15 for the outer end of the sleeve extension 12.

All of the parts of the housing structure are secured together by means of stud bolts 16 at opposite ends of the housing which secure the end plates 9 and 10 to the cylindrical portion 8 and the internal rings 13 and 14, and stud bolts 17 which secure the closure plate 15 to the sleeve extension 12.

The sleeve-extensions 11 and 12 carry the outer races of tapered roller bearings 18 the inner races of which are snugly fitted on the shafts 4 and 5, these races serving to position the core 2 both radially and axially. For purposes of sealing off the annular spaces 19 from both ends of the mechanism, sealing rings 20 are provided.

The adjustment of the roller bearing assemblies 18 is accomplished by means of a ring nut 21 and a lock nut 22 which screw into the outer end of the sleeve-extension 12.

The shaft 4 is sealed by laminated plates 23 which alternate with plates 24, the plates 23 being fitted closely to the sleeve 11 and the plates 24 closely fitted to the shaft 4. While the plates 23 and 24 are fitted closely to the sleeve and shaft, respectively, as stated, they may nevertheless be pushed along the shaft 4 to assure tightness between the faces of the disks, by a spring 25 which in turn is adjusted by a ring nut 26, to the desired degree of tightness.

The housing 1 is shown as supported by cradle members 27 secured to a base 28.

The rotatable shell 3 comprises a cylindrical section 29, rings 30 forming end flanges of the shell, and cylindrical members 31, all of these parts being fitted together to form a unitary structure, the cylindrical members 31 serving as the inner race-ways of tapered roller bearings 32 the outer races of which are carried by flanged rings 33 adjustable within the housing structure 1 as hereinafter described.

The mechanism shown also comprises a pair of helices 34 and 34', of the same diameter and nested one within the other and which are provided on, and surround, the sleeve portion 6 of the core 2 for rotation therewith, these helices, which constitute inner or core helices, being of uniform pitch throughout their length, and being connected at one end, as for example by a pin, with the core 2, to insure simultaneous rotation of the core and the inner helices.

The mechanism also comprises another pair of larger helices 35 and 36, forming outer helices, which surround the core 2 and are fitted to the cylindrical inner circumference of the portion 29 of the shell 3. The helices 35 and 36 are of the same diameter and nested one within the other, the external diameter of these helices being the same as the internal diameter of the shell portion 29 and their internal diameter considerably greater than the external diameter of the sleeve portion 6 of the core 2, the helices 35 and 36 intermeshing with the helices 34 and 34' as shown.

As shown, the longitudinal axes of the core 2 and shell 3 are eccentrically disposed with relation to each other to such degree that the inner helices 34 and 34' bottom at their outer peripheries against the lower portion of the inner circumferential surface of the shell portion 29.

The axial position and adjustment of the bearings supporting the shell 3 is determined by the adjustment of set screws 37 at each end of the mechanism, these set screws being threaded into the end plates 9 and 10 of the housing 1 and bearing at their inner ends against the flanged rings 33.

The rotatable shell 3 is shown as adjustable crosswise of its longitudinal axis, to insure the desired pressure contact between the core helices 34 and 34' and the internal surface of the shell portion 29 at its bottom, by means of radially disposed adjusting screws 38 which screw into the housing 1 adjacent its ends, and against the peripheries of the flange-rings 33, the flange rings 33 having flattened portions 39 at opposite sides thereof at which these rings have sliding contact with correspondingly flattened surfaces 40 on the rings 13 and 14 which are concentrically located in the central cylindrical portion 8 of the housing 1. The surfaces 39 and 40 form guides for positioning transversely the shell-support bearings 32.

The end members 10 and 9 of the stationary housing 1 have inlet and outlet openings, respectively, which communicate with pipes 41 and 42, respectively, the fluid to be pumped when the mechanism is used as a pump and the fluid to operate the mechanism when used as a motor being supplied to the mechanism through the pipe 41, and the pipe 42 serving as a discharge for the fluid.

The parts are so proportioned and arranged as shown that there is provided within the housing 1 at the fluid inlet end a space which communicates with the inlet pipe 41 and is open to the adjacent end of the helical structures above referred to, and at the fluid discharge end a space which communicates with the discharge pipe 42 and is open to the adjacent end of these helical structures.

It will thus be understood that an assembly of inner and outer helices as set forth above creates sets of crescent shaped pockets; in the particular construction shown and involving the assembly of two sets of helices, two sets of wide pockets 43 and two sets of narrow pockets 44. As the core 2 rotates, these crescent shaped pockets or spaces travel progressively axially along the core 2 and serve to convey fluid from the entrance space in communication with the fluid inlet pipe 41 to the discharge space in communication with the fluid discharge pipe 42. To aid in maintaining the mechanism fluid-tight the bottoms of the pockets 44 are preferably lined with any suitable resilient material as represented at 45, to serve as sealing means.

For regulating the degree of pressure between the inner, core, helices and the outer, shell, helices and for taking up wear of these parts one end of the tubular coupler member 6 of the core 2 is provided with a flange 46 having an annular series of holes 47 therethrough and its opposite end has threaded thereon a nut 48 having an annular series of holes 49. The helices are embraced between the flange 46 and nut 48 and are compressed one against the other to the desired degree by adjusting the nut 48.

It is highly desirable that the inner and outer intermeshing helices mutually engage flatwise as thereby surface contact between the helices, as distinguished from line contact between them is obtainable resulting in a degree of tightness comparable with a piston packed plunger pump, such fluid tightness of the mechanism, coupled with the fact that all parts of the mechanism rotate in synchronism about their centers, permitting vibrationless, noiseless operation at all speeds, adapting the mechanism when used as a pump to pump high pressures and when used as a motor to develop great power.

I obtain such mutual flatwise engagement between the helices by providing either the inner or the outer helices, or both, of such flexibility in a direction crosswise of the convolutions of the helix or helices, viz., in a general direction axially of the mechanism, (which flexibility is herein and in the claims referred to as "transverse" or "axial" flexibility) as to permit local yielding of such flexible helix to conform to the shape at those portions of the other, nonflexible, helix with which it engages, when only one has the flexible characteristic, or to cause both the inner and outer helices to flex to produce surface contact when both the inner and outer helices have transverse flexibility, such helix or helices thus being deflected into such form as to produce conforming surface-contact sealing engagement between the helices at their lateral surfaces.

The helix having transverse flexibility should have such inherent adequate radial stiffness as to prevent axial tilting of the portion of the helix exposed to the pressure of the fluid during the operation of the unit. For relatively high fluid pressures special provision, such as for example as hereinafter described, should be made for preventing tilting of the exposed portions of the helices having transverse flexibility and sealing the outer edges thereof.

The particular construction shown in Figs. 1-5 contemplates that the outer helices 35 and 36 have transverse flexibility, as above described.

In the case of the use of the mechanism as a pump the axial thrust which is exerted on the thin outer helices 35 and 36 by the fluid being pumped is transferred to the core 2 through pressure against the sides of the helical grooves in which these helices move. The fluid pressure exerts a transverse bending moment against those portions of the thin helices which extend outwardly beyond the core helices. Where the magnitude of the fluid pressure to be encountered warrants, this bending moment may be transferred to flat transversely flexible spacer-helices 50 located between the convolutions of the thin flexible helices at their peripheries. The bearing 31 adjacent the inlet 41 and which serves as a thrust bearing, picks up the axial pressure from the spacer-helices 50. In order to meet this pressure most effectively it is desirable to set the thrust bearing 31 adjacent the inlet 41 at a slight horizontal angle relative to the axis of the core 2 in a direction to follow the natural slope of the angle of the helices.

The shell 3 is shown as operatively connected with the core 2, to insure synchronous rotation of these parts, by means of radial ribs 51 provided on a hub portion 52 of the shaft 5 and projecting into radial relatively wide recesses 53 in the inner face of one of the rings 30 of the shell 3.

The mechanism just described and particularly adapted for handling liquids may be rendered adapted to the handling of gases with high efficiency, by so changing the pitch of both the inner and outer helices, as shown in Fig. 6, that the crescent-shaped outer pockets noted on this figure at 43a for the fluid will be of decreasingly graduated width toward the discharge end of the mechanism to correspond with the reduction in volume of the gases under compression, instead of the same width as shown of the pockets 43 in Figs. 1-5.

In the case of the modified construction just referred to for use with gases and in the case of the use of the construction of Figs. 1-5 with nonlubricating fluids it will be desirable to equip the two sets of roller bearings with lubricant seals of the conventional type.

The construction shown in Figs. 7 and 8 illustrates an embodiment of my invention wherein wide helices and narrow helices intermeshing therewith, are employed but the helices are reversed as compared with the arrangement shown in Figs. 1 to 5 in that the wide helices are carried by the rotating shell and the narrow helices having transverse flexibility are carried by the core.

In this case wherein plain bearings are shown instead of roller bearings, but merely for the sake of simplifying the illustration of the construction, the structure presents substantially the same combination of major parts as in the combination shown in Figs. 1-5. The stationary housing is shown at 54; the rotatable core at 55 and journaled in plain bearings 56 and 57 in the ends of the housing 54; the rotatable shell at 58 journaled at its ends in sleeve bearings 59 and 60 which loosely surround the shaft ends of the core 55 and are adjustable transversely of the longitudinal axis of the mechanism, by adjusting screws 61, which screw into the housing 54 and against the bearings 59 and 60 to adjust the shell in a radial direction.

Blocks 62 secured to the interior of the housing 54 by screws 63 have flat inner end faces 64 which form guides cooperating with flat faces 65 of lugs 66 carried by the bearing rings 60.

The core 55 carries two thin helices 67 and 68 of the same diameter and having transverse flexibility, one nested within the other. Fitting the shell 58 and of larger internal diameter than the external diameter of the helices 67 and 68; and rotatable with the shell 58 are two helices 69 and 70 of the same size one nested within the other which intermesh with the helices 67 and 68 to form relatively wide crescent shaped pockets 71 and narrow crescent shaped pockets 72 all of the pockets being closed at the bottom of the shell 58. The pockets are in communication at one end of the helical structure with a space within the shell 58 which communicates with a fluid-inlet pipe 73 and at the opposite end of the helical structure with a space within the shell 58 which communicates with the discharge pipe 74.

As will be understood, the operation of this mechanism is the same as described above as to Figs. 1–5.

It may here be stated that the thin helices 67 and 68 may be provided as rigid elements and the wide helices 69 and 70 made to present transverse flexibility to conform to the thin helices, as for example by using rubber or synthetic rubber, such as for example Neoprene, or similar material in the construction of the wide helices. Another means of making the wide helices to present transverse flexibility is to form them of flat metallic bands having sufficient inherent flexibility to permit them to follow the surface contour of the narrow rigid helices.

A mechanism utilizing this metallic band feature is shown in Figs. 9 and 10. This mechanism is practically identical with that shown in Figs. 7 and 8, corresponding parts being indicated by the same numerals excepting that the thin inner helices 67 and 68 are rigid and the wide outer helices 69 and 70 are replaced by band helices indicated at 75 and 76 and which are supported by spirally wound wire helices 77 and 78 the convolutions of which are attached to both the shell 58 and the band helices 75 and 76 as represented at 79 and 80, respectively. Sealing rings 81 at the ends of the band helices serve to prevent by-passing of fluid from the pressure zone of the mechanism to the suction zone.

Figs. 11 and 12 illustrate a construction of double acting pump or motor shown as involving another type of wide helix structure. In this arrangement a housing structure, shell, core and adjustment means are provided as in the construction shown in Fig. 7 and are given the same designating numerals.

In this arrangement the nested outer thin helices fitting the shell 58 and rotating with it are represented at 82 and 83, these helices also fitting outside of an inner shell 86a which is closed at its ends by circular plates 86. The cooperating wide rigid helices are represented at 84 and 85, being connected at their ends with the core 55 by means of arms 55a. The interaction of the narrow and wide helices serves to form two sets of crescent shaped pockets, an upper set 87 and a lower set 88, which move axially to convey fluid as the helices rotate.

Figs. 13 and 14 illustrate a construction of triple acting pump or motor shown as involving another arrangement of helices. In this arrangement a housing structure, rotating shell, core and adjustment means are provided as in the construction shown in Figs. 7 and 8 and are given the same designating numerals.

In this arrangement I provide two sets of thin flat helices one set comprising helices 89 and 90 and the other comprising helices 91 and 92, these helices being supported by thin edgewise helices 93, 94, 95 and 96, the helices 95 and 96 fitting the shell 58 and the helices 93 and 94, staggered relative to the helices 95 and 96, being carried by, and rotatable with, the core 55, the assembly of these helices forming two sets of generally T-shaped intermeshing helices.

The proportions of the parts are such, as shown, that three sets 97, 98 and 99, of crescent shaped pockets or spaces for the fluid, open at the ends of the helical structure, are provided. The pockets 97 are at the upper portion of the mechanism and provided between the shell 58, the band helices 89 and 90 and the edgewise disposed helices 95 and 96. The pockets 98, also at the upper portion of the mechanism are provided between the core 55, the band helices 91 and 92 and the edgewise disposed helices 93 and 94; and the pockets 99 at the lower part of the mechanism are provided between the band helices 89—92 and the edgewise disposed helices 93—96. The mechanism is thus caused to be triple acting.

Referring to the modifications of the helical structures illustrated in Figs. 15–64, inclusive, such modified structures represent different types of helical structures involving different arrangements of pairs of cooperating helices which apply not only to structures such as are shown in Figs. 1–14, inclusive, but also to the other structures shown in the drawings and involving inner and outer helices. As these modifications apply to the structures of Figs. 1–6, as above stated, the shell and core structures shown in the drawings of these modifications are given the same designating numerals as in the case of certain of the structures of Figs. 1–6, to which they are applicable.

In accordance with the showing in Figs. 15 and 16 one of two thin helices having transverse flexibility, one nested within the other as in Figs. 1–5, and shown at 100 and supported by the cylindrical portion 29 of the shell 3 is shown as cooperating with two wide rigid helices 101 and 102 spaced apart to receive the helix 100 and secured to the core 2, the fit between the helix 100 and the shell 3 being such as to permit a slight amount of relative axial movement between these parts.

Resilient sealing coatings 3a and 6a, as for example of Neoprene, are shown as provided on the inner surface of the shell 3 and on the bottom of the helix groove on the core 2. Likewise this feature may be applied to many of the other constructions shown.

In Figs. 17 and 18 wherein the nested core helices indicated at 103 and 104 and carried by the core 2, are wide and rigid, the outer helices are provided as structures having transverse flexibility but reinforced to withstand the pressure existing in the crescent shaped pockets of the mechanism, where the pressure is high, these outer helices being built of three pieces consisting of a pair of helical thin metal members 105 and 106 with a reinforcing member 107 between them, all supported by the rotatable shell 3, the reinforcing member 107 consisting of a skeleton of sinusoidally wound hardened tempered wire, the convolutions of which follow generally radial lines as shown. The reinforcing member 107 may, if desired, be spot welded to the thin helical members 105 and 106 at appropriate points. A helical sealing strip 108 may be attached to the outer periphery of the helical assembly with sealing means 109 inserted within this strip. Various other structures for providing such reinforcement may be employed.

In order to cause the sinusoidal reinforcing member 107 to conform with the lateral surfaces of the core helices 103 and 104, radial elements 107a secured to the core 2 and projecting into the spaces between loops of said sinusoidal member serve to direct said loops into true radial relationship to said core as these several members rotate in eccentric relationship.

Another method of reinforcing thin helices is shown in Figs. 19 and 20. In this arrangement wherein the core helices, indicated at 110 and 111 and carried by the core 2, are wide and rigid, the outer helices having transverse flexibility, one of which is represented at 112, are reinforced by providing them of corrugated form to present corrugations as shown. The spaces formed by the corrugations at opposite faces of the helices may be filled in with Neoprene or other elastic substance as indicated at 113 Fig. 20a and thin helical metal facings 114 may be provided at opposite faces thereof for wearing purposes and for presenting antifriction surfaces.

Still another method of reinforcing thin outer helices is shown in Figs. 21 and 22 wherein the inner core helices, represented at 115 and 116, are wide and rigid and are carried by the core 2. The thin outer helices, one of which is represented at 117, straddle slotted rigid rods 118 which slide in radial openings 119 and 120 in the inner helical structure (115 and 116) and in the core, respectively. Cross pins 121 in the rods and extending into elongated slots 122 in the helix 117 insure movement of the rods with the helix 117 at all times.

In addition to the foregoing examples shown, where transverse flexibility is afforded in the thin helices it is also practicable to construct devices of this character wherein the thin helices are rigid and the wide helices have transverse flexibility. Such an arrangement is shown in Figs. 23 and 24 in which arrangement thin rigid helices 123 and 124 are fastened to the shell 3 and cooperate with wide helices 125 and 126 carried by the core 2. The helices 125 and 126 are formed of Neoprene, rubber or other substances affording transverse flexibility. The helices 125 and 126 may be secured to the core as for example by means of rivets 128 or by means of helical wearing strips 129 which, when used, should be attached at both ends to the core 2. If desired, the helices 125 and 126 may contain reinforcing wires 130 which may be formed therein and which may serve as a means for attachment of the helices 125 and 126 to the core 2 by securing these at opposite ends of the helices, to the core. A helical wrapping of flat strip metal 131 may be formed on the outside of each helix 125 and 126 for reinforcement and for wearing purposes.

Figs. 25 and 26 illustrate another construction employing thick helices having transverse flexibility. In this construction thin rigid helices 132 and 133 are supported by the shell 3. The wide helices 134 and 135 carried by the core 2, the body portions of which are made of material as described of the helices (of Fig. 23) are bound by flatwound metal strips 136 attached to or supported by the core 2.

The outer peripheral surfaces of the helices 134 and 135 are slightly curved transversely and support flat or band helical members 138, the members 138 being sealed at their lateral edges by thin flexible extensions which bear against the thin helices 132 and 133. Liners 139 are provided in the form of sealing rings as for example of Neoprene.

The construction shown in Figs. 27 and 28 is the same as that shown in Figs. 25 and 26 with the addition of sealing means for the lateral edges of the band helices 138 shown as comprising helical members 140 provided with grooves 141 into which the edges of the bands 138 extend for improving the sealing effect.

The construction shown in Figs. 29 and 30 is for a double acting type of pump and constitutes a modification of the structure shown in Figs. 11 and 12. The thin helices 142 and 143 fitting the shell 54 are located as in Figs. 11 and 12, but in this case they are rigid helices attached to the shell 54. Each of the flat band helices indicated at 144 and 145 comprises a comparatively rigid helical band 146 supported only at its ends of the core 55, and an axially flexible tube 147 of rectangular shape in cross section surrounding the band. Each helical band 146 presents axial clearance between its opposite edges and the surrounding tube 147, as indicated at 149. The double acting ring piston helices 144 and 145 with their tubes 147 maintain sealed radial pumping contact with the shell 54 and with the core 55.

For constructing small pumps, such as, for example, lubricating pumps, the helical structure arrangement shown in Figs. 31 and 32 may be employed as for instance in the pump of Figs. 1-5. This arrangement involves the use of two eccentrically disposed sets of helices, one set comprising the helices 150 and 151 of the same diameter and disposed one nested within the other and the other set comprising helices 152 and 153 of the same diameter, one nested within the other, the sets of helices being of different diameters each helix being formed of rectangular stock. The outer helices 152 and 153 fit in the shell 3 and the inner helices 150 and 151 are carried by the tubular coupler 6 of the core 2. All of these helices have sufficient transverse flexibility to permit them to conform to each other and maintain surface contact for pumping purposes. The fluid is pumped in an outer series of crescent shaped pockets 154 and an inner series of such pockets 155.

In certain types of the helical units of the uniform helical pitch type it is advantageous to continue at the discharge end each of the thin helical members beyond its normal length in true segmentally circular sections as shown in Figs. 33 and 34. In this construction, treating it as a modification of the construction of Figs. 1-5, both of the thin helices 35 and 36 are extended beyond their normal helical shape in true circular portions 156 and 156a leaving open at their ends spaces 157 and 157a. If acting as a pump in the form of a compressor, the crescent shaped chambers, one of which is indicated at 33a, immediately in front of the discharge chamber beyond the helical structure and indicated at 3a, would not open to the discharge chamber 3a until well past its normal opening point. This effect would be useful in compressors in that the gas in chambers 33a would be fully compressed before connection is established to the discharge chamber 3a, thus preventing any tendency to regurgitation or reverse flow into chambers 33a. These flat or circular portions 156 and 156a of helices 35 and 36 also may serve as discharge check valves, in instances where a fluid unit is operated as a compressor, or when operated as a liquid pump, with throttled inlet as shown in the construction illustrated in Figs. 104 and 105 with only partial filling of the crescent shaped pumping chambers.

This flat or circular portion of the thin helices may be detached from the thin helices proper as at 156b and lapped over helices as at 156c in order to maintain the flat ends of all helices in one plane.

Where the fluid unit operates as a compressed air motor, a steam engine, or as a liquid motor with constricted inlet, the arrangement shown in Figs. 35 and 36 would be useful. In these figures, assuming this feature, by way of example, to be applied to the construction shown in Figs. 1-5, modified as shown in Figs. 33 and 34, the shell 3 is provided with a pair of peripherally adjustable segmental members 158 and 159 at the inlet of the device confined between one end of the core-helices and a washer 158a on the core 2, the members 158 and 159 being connected together as by connecting strips 159a. The members 158 and 159 are so arranged that by varying their relative peripheral position with respect to the fixed segmental members 156 and 156a, the angle of admission of fluid to the unit, or the "cut-off," may be controlled. This arrangement would apply particularly to units used as steam engines.

In some applications of my invention it may be desirable to cool the thin helices. This may be accomplished as shown in Figs. 37 and 38 wherein, treating this showing (by way of example) as a modification of the construction shown in Figs. 1 to 5, the thin helix 35 is provided with a chamber or passage having requisite cooling liquid pipe connection (not shown) at each end, such chamber or passage for the helix 35 shown being represented at 160.

For units operating at high fluid pressures or when operating on gases it may be desirable to provide the effect of several "packing rings." This may be accomplished by the use of several flat band helices, each formed of helical strips, in flatwise concentric contact, alternate ones of the strips having edge-sealing means, as shown in Figs. 39 and 40, in which figures, treating the relatively eccentrically disposed shell and core as the shell and core of Figs. 1-5, the shell 3 carries thin rigid helices 161 and 162, and the core 2 flat band helices 163 and 164 each formed of helical strips 165—167 flanged at their edges and filler helical strips 165a and 166a alternating therewith, the helices 163 and 164 being supported by tubular or spirally wound hollow members, one of which is shown at 170 supported on the core.

Other forms of helical structures in which pairs of cooperating helices may be provided are disclosed in Figures 41 to 64.

Figures 41 to 46, inclusive, show helical arrangements for use in certain of the illustrated types of units and particularly in the types shown in Figs. 1-6, inclusive, and involving the rotatable shell 3 and rotatable core 2 eccentrically disposed. The outer helices fitted in the shell 3 and herein designated 171 and 172 are thin rigid helices.

Referring now to Figs. 41 and 42, the inner helices which are carried by, and are rotatable with, the core 2 and are indicated at 173 and 174, are formed of several flat, strip wound leaf helical strips 175, 176 and 177 having transverse flexibility and embraced by channel shaped restraining members 178. The inner helices 173 and 174 are radially supported by pairs, respectively, of helical members 179 and 180 having contacting surfaces formed of circular arcs so that one may rock slightly on the other thus providing compensation for the slight deformation of the flat helical strips 175-177. These assemblies of parts 175-180, inclusive, are supported on helically wound helical members or tubular members 181 and 182 which may have sealing strips 183 at each side. These entire helix assemblies are carried by the core 2 and are cooperative with the thin outer helices 171 and 172 as in the construction shown in Figs. 1-5.

Referring now more particularly to Figs. 43 and 44 the inner helices carried by the core are represented at 184 and 185 and are each formed of a helical member 186 having transverse flexibility made from a corrugated strip of metal, the corrugations at opposite sides of the member 186 being fitted with filler pieces 187 and 188, respectively, and a helically strip-wound helical member 189, square in cross section. The pieces 187 and 188 and the helically wound helical member 189 extend into restraining rings 190 at each end of the pieces 187 and 188.

Figs. 45 and 46 show a helical assembly which functions similarly to the assemblies of like type shown in Figs. 41-44, inclusive. The inner helices 191 and 192 carried by the core 2, however, are of different form, each comprising inner and outer laminated helical structures 193 and 194, respectively, spaced apart with radial connecting pins 195. The helical structures 193 and 194 may be of either of the constructions shown in Figs. 53 and 54 or 55 and 56 and hereinafter described, to provide for transverse flexibility of the inner helices 191 and 192. Helical sealing strips 196 embrace the laminated structures 193 and 194 connected together by the pins 195.

The helical arrangements shown in Figs. 47 to 52 apply to structures of the general type shown in Figs. 13 and 14, wherein the helical pistons are of the double acting type.

In the arrangement shown in Figs. 47 and 48, the helices corresponding with the helices 89 and 90 of Figs. 13 and 14 are represented at 197 and 198 and the helices which correspond with the helices 91 and 92 of Figs. 13 and 14 are represented at 199 and 200. The helices 197 and 198 of this construction are each formed of a group of leaf helices 201, 202 and 203 having transverse flexibility attached to the outer ends of radial pins secured to the core 55, the pins for the helices 197 and 198 being represented at 204 and 205, respectively. The helices 199 and 200 are each formed of a group of leaf helices 206, 207 and 208 having transverse flexibility and attached to the inner ends of radial pins secured to the rotating shell 58, the pins for the helices 199 and 200 being represented at 209 and 210, respectively. The several pins are sealed by thin helical strips represented at 211 thereby forming helices corresponding to the helices 93, 94, 95 and 96 of Figs. 13 and 14.

The arrangement shown in Figs. 49 and 50 is substantially the same as that shown in Figs. 47 and 48, except that the flat helices rotatable with the shell 58 and represented at 214 and 215 and the helices rotatable with the core 55 and represented at 212 and 213, are non-laminar. In this arrangement the corrugated helix feature of Figs. 43 and 44 is incorporated in the helices 212—215.

The arrangement shown in Figs. 51 and 52 is substantially the same, in general, as that shown in Figs. 47 and 48, the helices corresponding with the helices 197 and 198 of Figs. 47 and 48 being represented at 216 and 217 and those corresponding with the helices 199 and 200 being represented at 219 and 218, the helices 218 and 219 being connected with the shell 58 by pins 220 and 221 and the helices 216 and 217 being connected to the core 55 by pins 222 and 223. The laminar interlocking helices 216—219 may, by way of example, be of the type shown in either Figs. 53 and 54 or 55 and 56 and hereinafter described.

Figs. 53 and 54 and 55 and 56 show structures of the articulated leaf type; Figs. 53 and 54 showing the helices as made of laminar interlocking leaf helices 224 carried on pins 225, and Figs. 55 and 56, leaves 226 carried on pins 227, the pins 225 and 227 connecting with the above referred to rotating shell or core, as the case may be. In both constructions flexible sealing strips 53a embracing the leaves at their opposite edges may be provided as shown, ripple shaped springs 53b being interposed between the leaves and strips 53a to provide for a slight compression of the helices on either side if desired.

As will be understood, the articulated constructions of helices described and involving the link and pin feature and being in the nature of chains, possess transverse flexibility while the interlocking leaves provide a virtually fluid tight construction. The forms of interlocking leaf constructions shown, as well, as any other forms of constructions of such general type, may if desirable have the alternate surfaces of the interlocking leaves coated with Neoprene or like substance with integral lubricating means for providing gas tightness.

Figs. 57 and 58 and 59 and 60 are other examples of helical construction providing transverse flexibility.

In accordance with the showing in Figs. 57 and 58 the helix, to render it transversely flexible, may be in the form of a chain-mat as shown in which its links 228 are pivotally connected together near their tops and bottoms by pins 229 to form a solid structure, the intermediate ones of these links being apertured as indicated at 230 to render them of light weight.

In accordance with the showing in Figs. 59 and 60 the helix therein shown is formed of laminar edgewise central deep laminae 231 and shallow laminae 232 at opposite sides thereof, the laminae 231 and 232 being loosely connected together, as a whole, by pins 233, to form a helix of T-shape in cross-section, such, for example, as is used in double acting units of the type shown in Figs. 51 and 52. Here also the faces of the laminae may be coated alternately with Neoprene or similar material to provide leak-proof contact.

Figures 61, 62, 63 and 64 illustrate a form of unit in which the helical angle of the flat helices may be varied to give variable volume characteristics to the mechanism for any desired use; a combination of such mechanisms being utilizable for variable ratio fluid transmissions.

Treating this construction, but by way of example only, as a modification of the mechanism of Figs. 1–5, the shell and core are given the same designating numerals as in these last-referred-to figures.

The outer helices fitting in the rotating shell and shown as each formed of a pair of flatwise opposed helical strips, are represented at 234 and 235 and are provided as radially stiff members but having transverse flexibility.

The inner helices carried by the core 2 and represented at 236 and 237, are each formed of two opposed sets 238 and 239 of thin flat helical interacting members 240 of wedge form in cross section. These sets of wedge members are attached, respectively, to helical members 241 and 242 having inwardly projecting multi-wedge surfaces 243 and 244, respectively. Located between, and movable lengthwise of, the members 241 and 242 is a center helical member 245 having wedge-shaped surfaces 246 and 247 on its opposite edges cooperating with the wedge-shaped surfaces 243 and 244 on the members 241 and 242, whereby the axial distance across this helical assembly may be governed by the peripheral adjustment of the member 245.

The member 245 has a terminal surface 248 upon which pressure is exerted by fluid entering from a pressure chamber of the unit through a metered opening 249. Grooves 249a cut in the serrated edges of the helical member 245 serve to convey the pressure regulating fluid throughout the length of the member 245 to thereby equalize the hydraulic thrust as between members 241, 242 and 245 throughout their length. A leakoff for such pressure regulating fluid is provided at 250 and by proper controlling means for such leakoff the peripheral position of member 245 may be determined, thus also controlling the width of the built-up helices and the volumetric capacity of the unit. The controlling means for the leakoff at 250, may by way of example, be in the form of a throttling valve (not shown) located at the outlet of an extended passage leading from 250 to an external point. As the helices 234 and 235 are radially stiff and transversely flexible, as stated, these helices accommodate their helical path to any position that may be assumed by the variable pitch helices.

In some forms of helical arrangements, especially those of the progressive helical pitch type it is desirable to provide for a slight amount of compression of the broad helices; for this purpose I provide at the edges of such helices on either side a spring of a ripple shape such as shown at 53b in Figs. 53 and 54.

Figures 65–68 and 73 and 74 illustrate certain modifications of the means for producing synchronous rotation of the rotating shell and core above referred to. Treating these showings as applied to the structures of Figs. 1 to 6, and referring to Figs. 65 and 66, the hub 52 of the core 2 is provided with radial ribs 251 which extend into wide recesses 252 in the ring 30 of the shell 6 adjacent the hub 52 and thus insure synchronous rotation of the shell and core.

Referring now to Figs. 67 and 68, the synchronous rotation desired is effected by providing a wheel 253 of gear form on the core 2 the teeth of which mesh with the valleys of an internal cog formation 254 on the shell 6 of a diameter considerably greater than that of the star wheel 253.

In accordance with Figs. 73 and 74 the end of the core 2 is provided with a circular series of axially extending pins 255 which extend into circular recesses 256 on the inner face of one of the end plates of the shell 6.

Figures 69–72 illustrate several means for effecting synchronous drive of the core and shell and apply where the connections should be made at points intermediate the ends of the helical structure, as for example in the type of structure shown in Fig. 88 and hereinafter described, these several modifications being treated, by way of example, as applied to the structure of Fig. 88.

According to Figs. 69 and 70 the core herein shown at 257 is provided with radial pins 258 which extend into sockets 259 in a ring 260 fastened concentrically in the rotating shell herein represented at 261, these sockets being elongated peripherally of the shell 261, and afford a drive of the same general character as that shown in Figs. 65 and 66.

According to Figs. 71 and 72, the connections between the rotating shell hereinafter indicated at 262 and the central part of the core herein indicated at 263 are in the form of parallel links 264 pivoted at their outer ends by pins 265 to an inwardly extending annular flange 266 on the shell 262 and extending at their inner ends into an annular groove 267 in the core wherein the links 264 are pivotally connected to the core 263 by pins 268 carried by rings 269 secured in the recess 267 and engaging the links 264.

Figs. 75 and 76 illustrate a form of means for securing, if found desirable, the outer helices to the rotating shell at the fluid inlet end of the mechanism. Treating it, by way of example, as applied to the construction of Figs. 1-6, it involves providing this end of the shell 6 with an inwardly extending annular flange 270 to which the adjacent ends of the helices 35 and 36 are secured, as by pins 271 and 272, respectively.

In Figs. 77 and 78 are shown a unit of the same general construction as that shown in Figs. 1-5, inclusive, corresponding parts being given the same numbers as in these last-referred-to figures.

In this construction the outer helices 35 and 36 fitted in the shell 3 are of greater internal diameter than the overall diameter of the inner helices 34 and 34' thus causing a space to be presented between the outer and inner helices which is filled by a crescent shaped solid member 273 supported at its ends, in the form of flat portions, on the housing structure 1, as shown.

Another type of mechanism involving certain features of my invention embodies an outer helix structure on the inner cylindrical surface of a shell and embracing several small helical rotors or screws which are rotatably housed in circular passages in a central core. Units of this type may be constructed either with the shell stationary and the core rotatable or with the shell rotatable and the core stationary. Such a unit with the shell stationary and the core rotatable is shown in Figs. 79-82 in which figures the cylindrical shell is represented at 274 (its inlet and discharge being shown at 274a and 274b) and is provided with a plurality of nested helical threads 275, and 275a—275e on its inner periphery, forming parallel outer helices, the shell 274 being open at its opposite ends for entry and discharge, respectively, of fluid. The rotatable core referred to is represented at 277 and the small inner helices, each of which has a double thread, at 278. The passages in which the small helices 278 rotate, in cooperation with the outer helices with which they intermesh, are represented at 279.

A small cap plate 277a is attached to the outer end of the core 277, for the purpose of retaining the small inner helices 278 in position.

Such a unit with the shell and its helices rotatable and the core stationary is shown in Figs. 83-87. The shell of this construction shown at 280 and shown as having heat-dissipating fins 281, is rotatably mounted in bearings 282 and 283 on a base 284 and has nested helical threads 285 and 285a—285e on its inner surface as in the case of the shell of Figs. 79-82. The core is represented at 287 and is stationarily supported at one end on the base 284 and contains circular passages 288 in which small helices 289 having double threads 290 and 291 intermeshing with the threads 285 and 285a—285e of the outer helices, are rotatably confined.

The core 287 is hollow providing the central passage 292, the fluid entering the mechanism through a passage 293 in the structure, thence being operated on by the action of the outer and inner helices, discharging into the shell 280 beyond the helices and from the shell discharging into the adjacent end of the passage 292 in the core from which it discharges through the opposite end of the core.

The outer helices are shown in Figs. 83-86 as made in one piece with the shell. Fig. 87 shows a modification of this wherein the outer helical threads 285, 285a—285e are formed of rolled stock separate from the shell 280 and are secured in helical grooves 280a in the shell.

As will be understood both mechanisms of Figs. 79-87 in operating cause the fluid to become positioned in crescent shaped pockets which progressively move axially along the mechanism when driving force for rotating the core or shell, as the case may be, is applied, producing axial flow of the fluid from the entry point to discharge.

Units of all of the types above described may be built on the double flow principle, viz., involving the flow of fluid from opposite ends of the unit toward its center, or vice versa, by providing two pumping elements mounted on the same shaft or core and having oppositely inclined pitch angles with the result that where the fluid enters at both ends of the unit it is discharged at the center and where entered at the center is discharged at opposite ends. Conversely such unit will operate as a fluid motor where fluid enters at the center, divides in two paths, the separate streams of fluid flowing through the helical structure elements, respectively, one toward one end and the other toward the other end, or where the fluid enters both ends of the unit and flows toward the center.

The embodiment of this principle in a unit is represented in Figs. 88-92, the unit as illustrated comprising a housing structure 294 having a central cylindrical portion 295 closed by cylinder heads 296 carrying tubular extensions 297, suction pipes 298 and 299 opening through these heads into the housing 294.

The housing 294 contains a shell 300 rotatably mounted therein and a core 301 rotatably mounted in the housing 294, and having a central tubular portion 302 and shaft extensions 303 and 304, the core 301 being eccentrically disposed relative to the shell 300, and means for adjusting the shell radially relative to the core 301 as in the case of the construction shown in Figs. 1-5, being provided.

The drive connection for the core is indicated at 305, the opposite end of the core having a Venturi passage 306 therein opening into the space 307 within the portion 302 of the core and leading to a pipe 308 through which the pumped fluid discharges. The space 307 communicates by an annular series of openings 309 with the annular space 309a between the core and shell.

Interposed between the core 301 and shell 300 at opposite ends thereof are inner and outer helices supported by the core and shell, respectively, these helices having oppositely inclined pitch angles for discharge of fluid toward the center of the unit. Rings 310 and 311 at opposite ends of the central tubular portion of the core 301 forming, with the shell, crescent shaped openings 312, and rings 313 and 314 spaced apart at opposite sides of the openings 309a, near the center of the shell and secured to the latter, and having openings 315 and 316, are provided. Between the rings 310 and 313 and the rings 311 and 314 are the inner and outer helices referred to.

The outer helices of the intermeshing inner and outer helices at one end of the core, are represented at 317 and 318 and the inner helices thereof at 319 and 320; and the outer helices of the intermeshing inner and outer helices at the other end of the core are represented at 321 and 322 and the inner helices thereof at 323 and 324.

The outer helices 317, 318, 321 and 322 are shown as thin rigid helices attached to the rotating shell 300. The inner helices 319, 320, 323 and 324 are shown as of the built-up type and are generally similar to those shown in Figs. 41 and 42.

Referring to the operation of this unit it will be seen that the fluid is passed through the two sets of helices having right and left-hand helical pitch angles, respectively, and discharged into the central annular space 309a under pressure. From this point the fluid passes through the openings 309 into the central chamber 307 of the core 301, thence out through the Venturi passage 306 to discharge. The fluid passage in the core is shaped as a Venturi tube in order to permit the use of a minimum size opening without loss of hydraulic head.

The stationary discharge pipe 308 is secured to a stationary flange member 328 connected to the adjacent tubular end 297 of the housing. If desired, the pipe 308 may be expanded in diameter to effect an hydraulic velocity recovery in addition to that secured in the Venturi passage 306. A seal 329 at the right-hand end of the unit (Fig. 88) preserves fluid tightness under the low pressure obtaining in the suction chamber. A seal 330 at the left-hand end of the unit preserves fluid tightness between the discharge chamber and the suction chamber. Leakage, if any, past this seal would not escape to the outside but would merely return to the suction chamber.

In certain applications of fluid units, as for example in hydraulic transmissions, it is desirable to provide such unit with variable volumetric characteristics, this being provided for in the construction shown in Figs. 93–96.

In general this construction is like certain of those hereinbefore described, modified to render its volume variable under control.

It comprises a stationary housing 331 having an inlet 331a, a rotatable core 332 journaled in the housing 331, a rotatable shell 333 in the housing and surrounding the core, the shell 333 being adjustable radially relative to the core, and inner and outer intermeshing helical structures on the core and shell, respectively, producing axially movable closed crescent shaped pockets which in the operation of the unit, move toward the fluid discharge 334 of the unit, as for example generally as in the case of the structure of Figs. 1–5.

The outer helical structure comprises edgewise helices 335 and 336 rotatable with the shell 333. At the discharge end of the helices 335 and 336 is a ring 335a carried by the shell 333 having an annular series of holes 335b at its outer peripheral portion. Carried by the core 332 is a spring metal ring 332a bearing against the outer face of the ring 335a, the ring 335a having slight sliding movement in the shell 33 in an axial direction. This arrangement just described forms sealing means preventing flow of fluid from the discharge chamber into the space inside the inner helices.

The inner helical structure comprises band helices 337 and 338 rotatable with the core 332 and having transverse flexibility.

The helices 337 and 338 are made of spring steel and are connected at their leading edges with the core 332 whereby in the operation of the unit the helices are pulled around in the rotation of the core.

The core 332 is provided with bosses 339 having radial holes 340 arranged in helical series in which flat-headed pins 341 are reciprocable. The helices 337 and 338 surround the series of pins 341 and bear against the heads of the pins under the spring tension of the helices.

The pins 341 are movable radially to control the volume of fluid pumped by the unit. In the position shown in Figs. 93 and 94 the pins are in their innermost position in which the closed crescent shaped pockets 342 between the inner and outer helices are of maximum volumetric displacement.

In Figs. 95 and 96 the pins are in their outermost position in which the crescent shaped pockets 342 referred to are extinguished.

The position of the pins 341 is controlled by a member 343 axially adjustable in the core 332 and having a buttress thread 344 on its surface for engagement with the inner ends of the pins 341. When the member 343 is slid to the left in Fig. 93 to the position shown in Fig. 95 the pins are cammed outwardly and the pockets 342 are extinguished. When slid to the right the full distance (Fig. 93) the pockets of maximum volumetric capacity are produced.

Axial pressure for the operation of member 343 by automatic or manual means may be supplied, as for example, by additional hydraulically operated piston (not shown).

Any volumetric capacity of the pockets 342 between maximum and zero may be obtained by the corresponding setting of the member 343 in an axial direction.

The sleeve bearings 345 on the housing in which the shell 333 is journaled are provided with annular flanges 346, these flanges being set into circular recesses 347 of larger diameter in the ends of the housing 331. Bolting rings 348 secured to the housing and bearing against the flanges 346 seal them against leakage.

It will be seen that the bearing rings 345 with their flanges 346 have a certain degree of radial adjustment to be compensated for in accordance with the position of shell 333 according to the volumetric displacement for which the unit may be adjusted. The sealing ring flange 346 will take up a position in the recess 347 accordingly.

In order to definitely position the shell 333 with its rigid helices 335 and 336 so that the working helices 337 and 338 are at all times in contact with the shell 333 at the bottom point of travel, pressure pads 349 are provided which bear against the sleeve bearing members 345. These pressure pads are actuated by rods 350 which are pressed upward, as for example, by hydraulic piston and cylinder mechanisms 351.

One useful application of the variable volume unit lies in its incorporation in a hydraulic transmission for conversion of speed and torque between a driving member and a driven member, such a unit being shown in Fig. 97.

In this transmission the left-hand structure 352 is a variable volume pump being practically a duplicate of the unit shown in Figs. 93–96, the same numerals being applied to the same or corresponding parts, and the right-hand structure 353 is a motor being practically a duplicate of the unit of Figs. 1–5 the same numerals being applied to the same or corresponding parts.

The outlet 354 of the pump 352 continues through to the inlet 355 of the motor 353; the outlet 356 of the motor 353 opening into the right-hand end of the space 357 between the housing 358 (this housing being common to both the pump 352 and motor 353) and the shell 3 of the motor 353.

It will be seen that the liquid discharged from the hydraulic pump 352 flows through passage 354 and enters the inlet of the motor 353, under pressure, in which it is carried by the crescent shaped pockets between the helices of the motor to the outlet 356. From this point the fluid returns toward the left through the annular space 357, passes through ports 360—363 (these ports being arranged in an arcuate series), and the annular space 364 between the shell of the pump 352 and the surrounding housing back to the inlet 352a of the pump.

As a means of controlling the back pressure on the hydraulic motor 353 for dynamic braking purposes I provide an adjustable segmental plate 365 having an arcuate series of openings 366 registering with all but one or two of the ports 360 and by a slight rotational movement of this plate 365 from the position of registration of its ports 366 with certain of the openings 360, as above stated, by any suitable means (not shown), any desired braking effect on the hydraulic motor and its driven member may be effected.

When the segmental plate 365 covers those of the ports 360 with which it cooperates the one or two other ports 360 referred to, are not covered so that by providing a relief valve or valves opening toward the inlet of the pump 352, in such port or ports excessive fluid pressure rise within the housing structure 358 is avoided. Temperature rise in the fluid due to heat losses in the unit may be dissipated through fins 367 on the housing 358.

In the normal operation of the transmission the member 343 is moved to the extreme left in which position no liquid is discharged from the pump 352 and the hydraulic motor 353 remains stationary. In the movement of the member 343 to the right liquid in increasing quantities is fed from the pump to the motor, causing the motor to increase in speed until the member 343 reaches its extreme position to the right at which time the pump and motor will be operating at practically the same speed. In the thus conditioning of the parts, it is desirable that means be provided for effecting the drive of the motor 353 directly from the drive member which operates the pump 352. To this end I form the member 343 with a longitudinal bore 368 in which a shaft 369 having a jaw clutch 370 at one end is longitudinally adjustable, this jaw clutch cooperating with a similar jaw clutch 371 carried by the core 2, the jaws of the clutch being open in the position of the parts in Fig. 97.

This construction is shown as equipped with means like those shown in Fig. 93 and similarly designated for maintaining the inner helices in engagement at the bottom of the structure, with the rotating shells 333 and 3.

As will be understood, by releasing the pressure from the rods 350 of the fluid pump 352 and the fluid motor 353 these rods and their actuating means being also provided on the motor 353, the hydraulic unit will operate without any pumping effect thereby reducing friction losses to a minimum. With a transmission of this type as installed in an automobile a braking effect may be secured by disengaging the clutch coupling 370 and maintaining the member 369 in an intermediate axial position thereby causing the engine of the automobile to run at a higher speed than the propeller shaft of the automobile.

A form of fluid transmission is shown in Figs. 98–101 in which the fluid motor represented at 372 surrounds the fluid pump represented at 373. The fluid pump 373 is similar to that shown in Figs. 93–96 except that it is of the double flow type, an example of a double flow type being shown in Fig. 88.

In this construction the drive member is represented at 374 and the driven member at 375. 376 is the core of the pump 373 in which the buttress thread rod 377 is longitudinally adjustable and 378 is its rotating shell.

The inner and outer intermeshing helices of the pump 373 are shown at 384 and 385, the helices at opposite ends of the pump being so disposed as to pump from the ends of the pump to its center. The inner helices 384 are of spring steel anchored at one end and at all times hug radially movable pins 386 on the core 376 of the pump which cooperates with the buttress threads on the rod 377.

The discharge ends of the two sections of the pump are shown as provided with sealing means for preventing flow of fluid from the center discharge chambers into the space inside the inner helices as explained above in connection with Figs. 93–96.

379 and 379a are rings mounted in bearings 380 carried by vertically movable members 381 pressed downwardly by springs 382 interposed between them and the housing 383.

387 is a sleeve connected with the rings 379 and 379a forming the core of the motor 372 surrounding the pump 373, and 388 the rotating shell of the motor. The inner and outer helices of the motor are shown at 389 and 390, respectively, and are supported by the core 387 and shell 388, respectively, the helices at opposite ends of the motor being so disposed as shown that the motor is operated by fluid admission at the center of the motor, the spent fluid discharging at its ends. Registering holes 391 and 392 are provided in the shell 378 and core 387 adjacent the center of the pump and motor.

The core 376 and shell 378 of the pump are connected together to rotate synchronously by pins 393 on the core slidingly extending into separated sockets 394 on the shell 378. The core 387 and shell 388 of the motor are connected together to rotate synchronously by pins 395 on the shell 388 slidingly extending into separated sockets 396 on the core 387.

The motor 372 drives the driven member 375 by means of a spider 397 connected with the driven member 375 and having driving pin and recess connection at 398 with the shell 388, the arms of the spider extending through openings 399 in one of the rings 379.

Bearing upwardly against the shell 388 are rollers 400 on pistons 401 of fluid pressure cylinders mounted on a stationary housing 402 surrounding the pump and motor and which serve to maintain the shell 388 of the motor 372 in contact with the inner helices 389 of the motor at all times at the bottom portions of the motor and pump, and maintain the desired eccentric relation between the shell 388 and the core 387 of the motor and tight closure joint between these parts.

In the operation of the device, the buttress thread rod 377 being in the position shown in Fig.

100, the fluid filling the housing structure 402 flows into the suction chambers 403 and 404 at opposite ends of the pump and into the crescent shaped pockets 405 formed between the helices of the pump and closed at the top of the pump, the fluid being carried into the central spaces 406, thence outwardly through the openings 391 and 392 to spaces 407 and 408 which constitute the inlet chambers of the motor 372. The fluid thence flows into the crescent shaped pockets 409 formed by the motor helices and is carried thereby toward opposite ends of the motor, from which the fluid flows to the suction chambers 403 and 404 of the pump unit.

The buttress-thread-equipped rod 377 is used to control the volumetric capacity of the pump as explained of a previously herein illustrated construction of unit.

The rotary motion of the hydraulic motor 372 is transmitted to the driven member 375 by means of the spider 397.

Direct drive from the driven member to the part to be driven by means of the transmission is effected by a clutch device formed of a sleeve 410 rigid with the core 376 and having clutch teeth 410a, and a movable section 411 of a coupler on the driven member 375 and having clutch teeth 412 adapted to be interlocked with the clutch teeth 410a. When the coupler section 411 is slid from the position shown in Fig. 98 to the clutching position shown in Fig. 100 the drive is direct and the motor 372 is relieved of its load.

Figs. 102 and 103 illustrate another form of the telescope type transmission where a double flow fluid motor 413 surrounds a double flow fluid pump 414. In this instance, however, the working parts of the pump and motor units are of greater capacity on the right-hand side of the center line than on the left, by making the helices at the right wider than the ones at the left, the ratio of capacities, by way of example, being approximately 2 to 3.

The inner and outer intermeshing helices of the pump 414 operate to pump the liquid toward the center of the pump, the inner helices at the left hand side being shown at 415 and 416 and the outer helices at 417 and 418 and the wider inner helices at the right-hand side of the pump at 419 and 420 and the more widely spaced outer helices at this end of the pump at 421 and 422, the helices 415, 416, 419 and 420 having transverse flexibility.

423 is the core of the pump 414 journaled in a stationary housing 424 and carrying the helices 415, 416, 419 and 420. 425 is the rotatable shell of the pump carrying the helices 417, 418, 421 and 422.

A ring 426 secured to the shell 425 and lapping rings 427 on the core 423 divide the discharge space common to both pumping portions of the pump into separated annular spaces 428 and 429. The core 423 and shell 425 are connected together for synchronous rotation by radial pins 430 on the core 423 extending into separated sockets 431 in the ring 426.

438 is the rotating core of the motor 413 it being secured to rings 439 journaled in vertically movable members 440. The rotating shell of the motor is represented at 441 and has drive connection with the driven member 442 of the transmission through a spider 443 as in the case of the construction of Figs. 98–100. The shell 441 is supported in the housing 424 by a circular series of bearings 444 interposed between the shell and housing. The core 438 and shell 441 are connected together for synchronous rotation by radial pins 445 on the shell 441 extending into separated sockets 446 in a ring 447 on the core 438.

Registering holes 432 and 433 are provided in the shell 425 and the core 438, respectively, and connect the spaces 428 and 429 with spaces 434 and 435, respectively, at the inlet of the motor, these ports being shown as provided with radially outwardly opening check valves 436 and 437.

The motor 413 receives its actuating fluid from the pump 414 at the center of the motor and discharges it at opposite ends of the motor. The inner core helices of the motor at the left-hand side are shown at 448 and 449 and the outer shell helices at 450 and 451 and the wider inner helices at the right-hand side of the motor at 452 and 453 and the corresponding widely spaced outer helices at this end of the motor at 454 and 455, the helices 448, 449, 452 and 453 having transverse flexibility.

The core 423 has annular series of ports 456 and 457 which register with the spaces 428 and 429, respectively, and adjacent the left-hand end of the transmission a plurality of annular series of ports 458a, opening into the interior of the housing 424.

Slidable lengthwise in the core 423 is a tube 459 splined thereto to rotate with the core and having annular series of ports 460—463, and a plurality of annular series of ports 458 registering with the ports 458a in the core 423 when the tube 459 is in the position shown in Fig. 102 in which position the spaces 428 and 429 are in communication with the interior of the tube 459.

When the sliding tube 459 is in the position shown the fluid discharged from the pump 414 into the spaces 428 and 429 discharges through the ports 456 and 457 and through the ports 462 and 463 into the tube and back to the suction side of the pump 414 and therefore no driving force is communicated to the motor 413 and the driven member 442 is at rest, representing engine-idling position.

When the sliding tube 459 is moved slightly to the right it closes the ports 456 but not the ports 457. Thus the discharge from the left-hand side of the pump 414 passes through the space 428 into the inlet of the motor 413 driving it at slow speed (first speed), the discharge from the right-hand side of the pump by-passing through the ports 457 and 463 and tube back to the suction side of the pump.

When the sliding tube 459 is moved still farther to the right a slight distance it closes ports 457 and opens ports 456 to port 461. Thus the discharge from the right-hand side of the pump 414 passes through the space 429 into the inlet of the motor 413, causing the driven member 442 to be driven at a faster speed than when driven by the left-hand side only of the pump, viz., second speed.

When the sliding tube 459 is moved still farther to the right it closes both ports 456 and 457. Thus the discharge from both sides of the pump 414 passes through the spaces 428 and 429 to the motor inlets of both end portions of the motor 413 driving the motor, and therefore the driven member 442, at a still faster speed, viz., third speed.

When the tube 459 is moved still farther to the right port 460 registers with port 456 and port 462 registers with port 457 and both ends of the pump are by-passed and clutch teeth 464 at its end intermesh with clutch teeth 465 on a sleeve 466 within, and connected to the driven member 442 and direct drive is established.

Figures 104 and 105 show a type of fluid transmission in which the pump, and the motor operated by the discharge from the pump, are disposed in line, and the pump is caused to produce a variable discharge volume of fluid for controlling the speed at which the motor, and therefore the driven member, of the transmission, are to be driven.

As the pump and motor, represented at 467 and 468, respectively, are of the helical type as described in connection with other structures shown herein it is thought that it is not necessary to describe the parts in detail. Suffice it to say that the pump, in this closed system of circulation, receives the fluid to be pumped through the annular passage 469, which in accordance with this showing is controlled by a sleeve valve 470 movable axially by means of a collar 471 and a rod 472 attached thereto movable manually or by any suitable mechanical means, into different positions of closure of the passage 469.

Inasmuch as the pump discharge can be varied from full capacity, with the valve 470 wide open, down to zero discharge with the valve closed, or proportionate discharge value for any intermediate position, a ready means is provided for securing a complete range of speed ratios between the pump 467 and motor 468. The loss of power consequent upon throttling the suction to the pump is negligible where high operating fluid pressures are employed.

If desired, the interior of the housing structure may be partitioned off, as for example by rings 473 and 474, and the end spaces 475 and 476 provided with pipe connections 477 and 478 as shown, leading to and from external cooling means (not shown) for the operating fluid.

Combinations of either the pump or motor units, or both, herein contemplated, may be utilized in making various machines in addition to those described. Such pump units may be used as gas compressors in conventional refrigeration systems and likewise a combination of air compressor and air motor may be utilized to form a heat pump operating with air as a fluid, for space heating, cooling and air conditioning.

An embodiment of such a device is shown in Figs. 106–109, the unit therein shown combining the function of an air compressor, air cooler and dehydrator, and air motor for partially recovering the energy used in compressing the air.

This structure comprises a stationary housing 479, a core 480 rotatable in the housing, a rotating shell 481 rotatably mounted at hollow journals 482 in bearings 483 on the housing 479, the bearings 483 being adjustable up and down under the control of adjusting means, shown as screws 483a threaded in the housing 479 and lateral screws 484 carried by the housing and bearing against the bearings 483.

Between the core 480 and shell 481 are four sets of intermeshing helices of the general reversely positioned T-shaped form shown in Figs. 47–52. The inner or core helices 485 and 486 forming one of said sets and the outer or shell helices 487 and 488 forming another of said sets, both at the right-hand end of the structure, and constituting a pump, are on a variable helical pitch, producing inner and outer rows of crescent shaped pockets 489 and 490, respectively, at the upper portion of the structure, and a row of crescent shaped pockets 491 at the bottom of the structure, all of these pockets being of progressively narrower axial width toward the left-hand end of the structure. The inner or core helices 492 and 493 forming another of said sets and the outer or shell helices 494 and 495 forming the last one of said sets, at the left-hand end of the structure and constituting a motor, are of variable helical pitch producing inner and outer rows of crescent shaped pockets 496 and 497, respectively, at the upper portion of the structure and a row of crescent shaped pockets 498 at the bottom of the structure, all of these pockets progressively increasing on axial width toward the left-hand end of the structure.

A partition formed of a ring 499 carried by the shell 481 and spaced apart rings 500 carried by the core 480 separates the sets of pump and motor helices located at opposite ends of the structure.

The ends 501 of the shell 481 are extended radially outwardly and carry a cylindrical member 502 surrounding and spaced from the shell 481. A ring 503 alined with the partition ring 499 divides the space between the shell 481 and the member 502 into two annular spaces 504 and 505.

Rings 506 at the ends of the core 480 have annular series of openings 507 therein.

The rotating shell 481 at opposite sides of the partition plate 499 and partition ring 503 has annular series of openings 508 and 509 which open into the spaces 504 and 505, respectively, the heads of the adjacent end ones of the inner helices having openings 510 and 511, respectively, registering with the openings 508 and 509 in the shell 481.

The shell ends 501 also carry a cylindrical member 512 surrounding, and spaced from, the member 502 in which space 513 a plurality of spiral flat tubular coils 514 are located. The space 513 is open at one end, through an annular series of openings 515, with a circular passage 516 open at 517 and at its opposite end, through an annular series of openings 518 with an annular passage 519 open at 520.

The coils 514 of the group thereof communicate at one end of the group, through openings 521 at one end portion of the member 502, with the space 504, and at the other end of the group, through openings 522 at the other end portion of the member 502, with the space 505.

A passage at the right-hand side of the structure for air to be pumped is indicated at 523 and leads to the helical pumping structure. A passage 524 for the air to be discharged from the apparatus leads from the helical structure at the left-hand side.

The operation of the apparatus is as follows:
Power for driving the mechanism is applied to the core 480 and the effect of the operation on the air sucked into the pump is to compress it in the gradually narrowing pockets 489, 490 and 491 from which it discharges, in heated condition through the openings 509, 511, into the space 505, to the right through passages 505 to openings 522 and thence flowing to the left through the coils 514 where it is subjected to the countercurrent flow of air in the space 513 from the inlet 520 to the outlet 517. The cooled compressed air in the coils 514 thence discharges into the space 504 and thence through the openings 508 into the entry end of the pockets 496, 497 and 498 at the entry end of the left-hand or motor portion of the mechanism wherein it is caused to re-expand, thereby being utilized as a force aiding in the driving of the mechanism, the air which has become cooled and dehydrated in the motor, by expansion, discharging therefrom to the outlet 524 which would lead to a space to be cooled or refrigerated.

Any frost forming on the inside of the expansion portion of the machine and resulting from condensed and frozen moisture, will be automatically sheared from the surfaces of the core and shell helices and blown out of the discharge pipe, because of the shearing action of the parts in their relative movements.

The heat pump described may be utilized for space heating, utilizing the warm air discharged through the opening 517 in the passage 516, the unit acting as a heat pump; or the machine may be utilized for space cooling by the refrigerated air discharged from the duct 524 as hereinabove described.

Devices of the character embraced within my invention may be constructed to perform the functions of either a steam engine or an engine operating on any compressed gas or liquefied gas. For such service, the unit would be provided with means for varying the cut-off at the inlet, or the expansion may be controlled by constructing the helices to present a progressive helical pitch angle.

Such units may also be used to perform the functions of internal combustion engines. Figures 110-112 show a unit of this type.

This construction comprises a stationary housing 525, a core 526 journaled in the housing 525 at shaft ends 527 and 528 thereof connected together by a sleeve 529.

530 is a rotating shell in the housing 525 having a central cylindrical portion 531, circular end walls 532 and 533 and sleeve extensions 534 which are journaled in bearing members 535 vertically adjustable in the housing 525 by means of adjusting screws 536 threaded in the housing 525, the end walls 532 and 533 having annular series of openings 537 and 538, respectively.

The core 526 and shell 530 are connected together for synchronous rotation by rib and recess means 539 as hereinbefore described of one of the preceding constructions.

Between the core 526 and the shell 530 are inner and outer intermeshing helices of the generally reversely positioned T-shaped form shown in Figs. 47-52, the outer helices being of larger diameter than the inner helices.

The inner or core helices represented at 540 and 541 and the outer or shell helices represented at 542 and 543, the core helices rotating with the core 526 and the shell helices rotating with the shell 530, form inner and outer rows of closed crescent shaped pockets 544 and 545 at the upper portion of the structure and a row of crescent shaped pockets 546 at the bottom of the structure.

The entry end of the row of pockets 544 and 546 register with the openings 538 in the end wall 533 which connects, through a passage 547, with a supply of explosible mixture delivered to this passage through a pipe 548, as for example from a carburetor or mixing device (not shown), the passages 547 having a branch passage 549 which communicates with the entry end of the row of pockets 545.

The dischcarge ends of the row of pockets 544 and 546 communicate through the openings 537 in the end wall 532 with a passage 550 leading to exhaust 551. The discharge end of the row of pockets 545 communicate with a branch passage 552 of the passage 550.

The inner and outer helices 540—543, are of decreasing pitch from the entry end of the helical structure (the left-hand end) toward its center and of increasing pitch from the center of the helical structure to the outlet end (the right-hand end), thereby causing the axial width of the pockets 544, 545 and 546 as they move toward the center of the helical structure to decrease, and to gradually increase as they move away from the center toward the discharge end, the rate of increase in axial width of these pockets from the center toward the discharge end being greater than the rate of decrease from the entry end to the center, the ones of these pockets at the entry end being of considerably less axial width than those at the discharge end, all as shown.

Provision is made for producing a charge-igniting temperature in the pockets 544—546 as they reach a position axially of the device, in which they are of the smallest axial width, viz., when they reach the center of the helical structure, and the charges are under maximum compression, whereby the compressed charges are fired, causing the normal rise of pressure experienced in internal combustion engines and work is performed on core 526 through the expansion of said gases down to the spaces 550 and 552 whence the exhaust gases are expelled to the atmosphere through pipe 551.

The means shown for igniting the compressed charges comprise electrical resistance heating elements of plug form to which the compressed charges within the pockets of the lesser axial width are exposed causing ignition of such charges, one terminal of the plugs being grounded on the engine and the other terminals connected with the other side of the electrical circuit by wires 553 and 554 which connect with a slip ring 555 on the core 526 against which a brush 556, connected with one side of the electrical supply circuit (not shown) bears. The other or grounded side of the electrical circuit is shown connected to the engine at 556a.

As the inner and outer helices are each formed of two nested helices, as shown and described, six of the ignition plugs referred to and represented at 557—562 are provided in two diametrically opposed sets, plugs 557—559 being connected to the wire 553 and plugs 560—562 to the wire 554, these plugs being so positioned, as shown, that the compressed charges in the closed pockets as they become of the minimum axial width, are fired.

Provision is made for cooling the engine by providing an annular chamber within the shell 530 divided by partitions 530a extending lengthwise of the chamber into two segmental compartments 563 and 564. One end of the compartment 563 connects, by a passage 565 in the shell 530, with an annular groove 566 in one of the bearing members 535, which is open to a pipe 567 leading from any suitable source of cooling fluid. One end of the compartment 564 connects with a passage 568 in the shell 530 which opens into an annular groove 569 in the bearing member having the groove 566, the groove 569 connecting with a pipe 570 for discharge of the warmed cooling fluid. The stems of the helices 542 and 543 are hollow to provide cooling liquid circulating passages 571 and 572, extending throughout substantially the length of these helices and which open, throughout substantially their entire length, into both compartments 563 and 564, whereby cooling liquid circulates from pipe 567 through passage 565 to compartment 563, thence in parallel through the passages 571 and 572 in the helices to compartment 564 and thence to outlet pipe 570.

The cooling means also comprise an annular chamber within the core 526 divided by partitions 573 and 574 extending lengthwise in the chamber, into two segmental compartments 575 and 576. One end of the compartment 575 connects by passages 577—579 in the core (the passage 579 being annular) with an inlet pipe 580 for cooling fluid opening through a housing ring 581 on the housing 525 at the outer end of the core 526.

An end of the compartment 576 connects with passages 582—584 in the core 526 (the passage 584 being annular) with an outlet pipe 585 in the ring 581 for discharge of the spent cooling fluid, the passages 578 and 583 being separated by a partition 586 and the passages 584 and 579 separated from the passages 578 and 583, respectively, by arcuate fillers 587 and 588. The stems of the helices 540 and 541 are hollow to provide cooling liquid circulating passages 589 and 590, extending throughout substantially the length of these helices and which open, throughout substantially their entire length, into both compartments 575 and 576 whereby cooling liquid circulates from pipe 580 through passages 579, 578 and 577 to compartment 575, thence in parallel through the passages 589 and 590 in the helices, to compartment 576 and through passages 582—584 to the outlet pipe 585.

Fins 591 on the housing aid in the cooling of the engine.

In every case where a helically wound helical structure or a tubular helical structure is employed, as for example in the case of the helices 319 and 320 of Fig. 88, the discharge ends of such structures are closed to prevent back flow of the fluid therethrough.

Features of great practical value among others are the transverse flexibility of one or the other or both of the helices; the rotatability of the shell with the outer helical structure, and the maintenance under wear of pressure contact between the helices and the shell at the portion of the structure opposite that at which the crescent shaped closed pockets are formed each of which is a factor making for fluid tightness of the fluid unit with resultant high efficiency.

In this connection it will be understood that while the helical structures are shown as structures formed separate from the shell and core, the rigid ones of the helical structures may be made unitary with the shell or core as the case may be. Furthermore, while each of the various helical structures except Figs. 79-87 are shown as formed of a pair of nested helical members, this is not necessary as each may be formed of a single helical member or more than two nested helical members, and the helices of Figs. 79-87 likewise may be single thread helices or helices of any other number of nested threads as desired.

Consideration of the length of helices must be given to assure a complete closure between the inlet and outlet of fluid within the crescent shaped pockets, the number of complete turns of helix required depending on the number of separate helices (nested when a plurality of helices are employed) constituting each helix.

The word "helix" is used in the appended claims in its broad sense to define a structure formed of either a single helical member or any desired number of nested helical members forming a helical structure.

While I have illustrated and described several embodiments of my invention, I do not wish to be understood as intending to limit it thereto as the same may be variously modified and altered and the invention embodied in other forms of structure without departing from the spirit of my invention.

What I claim as new and desire to secure by Letters Patent is:

1. A rotary helical fluid unit comprising: a rotary cylindrical shell with an inlet port at one end, an outlet port at the other end, and having an eccentrically disposed rotatable core; an outer cylindrical helix in contact with said shell between the shell and said core; an inner cylindrical helix intermeshing with said outer helix and secured to said core; at least one of the helices being flexible axially to maintain lateral surface contact with the sides of the companion helix, the lateral contacting portions of the inner helix and outer helix being substantially perpendicular to said shell and core respectively, said helices cooperating to form fluid pockets which are rectangular in longitudinal cross section and progressively travel from said inlet to said outlet port when said core and shell are rotated.

2. A device as specified in claim 1 in which the longitudinal axis of the core helix is inclined slightly from parallel relationship with respect to the axis of the shell helix to minimize the flexing of the flexible helix when the core and shell are rotated.

3. A device as specified in claim 1, in which a spacer-helix lines the shell between the convolutions of the outer helix in order to brace the peripheral portion of the outer helix against excessive axial distortion.

4. A device as specified in claim 1, in which a spacer-helix lines the shell between the convolutions of the outer helix in order to brace the peripheral portion of the outer helix against excessive axial distortion, and a thrust bearing supporting one end of said shell and receiving the axial thrust of said spacer-helix.

5. A rotary helical fluid unit comprising a rotary shell having an inlet port and an outlet port at opposite ends, a rotary core, an inner rotary helix and an outer rotary helix, said helices intermeshing and located between said shell and core and relatively eccentrically disposed, at least one of said helices having transverse flexibility and deflected into such form as to produce conforming surface-contact sealing engagement between said helices at their lateral surfaces, said helices cooperating to form at least one fluid pocket, which receives said fluid through said inlet port at one end of the helices and, in the operation of the unit, closes and travels axially of the unit producing axial flow and discharge of fluid through said outlet port at the other end of the helices, and means restraining tilting in an axial direction of that portion of said flexible helix which is exposed to the axial pressure of the fluid.

6. A rotary helical fluid unit comprising a rotary shell having an inlet port and an outlet port at opposite ends, a rotary core, an inner rotary helix, and an outer rotary helix, said helices intermeshing and located between said shell and core and relatively eccentrically disposed, said outer helix having transverse flexibility and deflected into conforming surface-contact sealing engagement with said inner helix at its lateral surfaces, and said helices cooperating to form at least one fluid pocket, which receives said fluid through said inlet port at one end of the helices and, in the operation of the unit, closes and travels axially of the unit producing axial flow and discharge of fluid through said outlet port at the other end of the helices, and means in said shell restraining tilting in an axial direction of that portion of said flexible helix which is exposed to the axial pressure of the fluid.

7. A rotary helical fluid unit comprising a rotary cylindrical shell having an inlet port and an outlet port at opposite ends, a rotary cylindrical core, and an inner cylindrical rotary helix and an outer cylindrical rotary helix located between said shell and core, said helices intermeshing and eccentrically disposed to form closed pockets, both of said helices being of general T-shape in cross section, said helices being reversely disposed whereby the ends of the inner helix are located between adjacent stems of the outer helix and the heads of the outer helix are located between the adjacent stems of the inner helix, at least one of said helices having transverse flexibility and deflected into such form as to produce conforming surface-contact sealing engagement between said helices at their lateral surfaces, said fluid pockets receiving the fluid through said inlet port at one end of the helices and, in the operation of the unit, closing and travelling axially of the unit, producing axial flow and discharging fluid through said outlet port at the other end of the helices.

8. A rotary helical fluid unit comprising: a rotary cylindrical shell having an inlet port at one end and an outlet port at the other end, a rotary cylindrical core, an inner cylindrical helix and an outer cylindrical helix, said helices intermeshing and located between said shell and core and relatively eccentrically disposed, at least one of said helices having transverse flexibility and deflected into such form as to produce conforming surface-contact sealing engagement between said helices at their lateral surfaces, said helices cooperating to form at least one fluid pocket, which receives said fluid through said inlet port at one end of the helices and, in the operation of the unit, closes and travels axially of the unit producing axial flow and discharge of fluid through said outlet port at the other end of the helices; and means restraining tilting in an axial direction of that portion of said flexible helix which is exposed to the axial pressure of the fluid, said means comprising a helix located within said shell and between the convolutions of said flexible helix and being free to conform to the natural helical shape of said flexible helix as the latter conforms to its cooperating helix during rotation, and thrust bearing means for supporting one end of said third mentioned helix and shell with the axes of the third mentioned helix, shell, and bearing disposed at a slight angle to the longitudinal axis of said core.

HERMAN C. HEATON.